United States Patent
Kim et al.

(10) Patent No.: US 9,686,682 B2
(45) Date of Patent: Jun. 20, 2017

(54) SETUP OF MULTIPLE IOT NETWORK DEVICES

(71) Applicant: Belkin International, Inc., Playa Vista, CA (US)

(72) Inventors: Ryan Yong Kim, Rolling Hills Estates, CA (US); Ohad Zeira, Playa Vista, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

(21) Appl. No.: 14/947,001

(22) Filed: Nov. 20, 2015

(65) Prior Publication Data
US 2016/0088478 A1    Mar. 24, 2016

Related U.S. Application Data

(63) Continuation of application No. 14/455,940, filed on Aug. 10, 2014.

(51) Int. Cl.
*H04L 29/06*    (2006.01)
*H04L 12/24*    (2006.01)
(Continued)

(52) U.S. Cl.
CPC ......... *H04W 12/06* (2013.01); *H04L 41/0806* (2013.01); *H04L 63/0876* (2013.01);
(Continued)

(58) Field of Classification Search
CPC ..... H04W 12/04; H04W 48/08; H04W 48/16; H04W 12/08; H04L 63/061; H04L 63/18;
(Continued)

(56) References Cited

U.S. PATENT DOCUMENTS 6,892,230 B1 * 5/2005 Gu ...................... H04L 12/2805
370/254
6,910,068 B2 * 6/2005 Zintel ................. H04L 12/2803
709/218

(Continued)

OTHER PUBLICATIONS

Garcia-Morchon, Oscar, et al. "Cooperative security in distributed networks." Computer Communications 36.12 (2013): 1284-1297.*

(Continued)

*Primary Examiner* — Michael Simitoski
(74) *Attorney, Agent, or Firm* — Kilpatrick Townsend & Stockton LLP

(57) ABSTRACT

The present disclosure relates to setup of IoT network devices, and specifically to setup of multiple similar IoT devices at substantially the same time using joint authentication. Embodiments include, for example, receiving, at an existing network device on a network, one or more communications, wherein the one or more communications include an indication that multiple new network devices are associated with the network; receiving an indication that the multiple new network devices have generated a setup access point; establishing a connection with the access point of each of the multiple new network devices; receiving identification information, wherein the identification information includes information identifying each of the multiple new network devices; and transmitting the identification information identifying each of the multiple new network devices, wherein when the identification information is received, the identification information facilitates generating an authentication query to authenticate one or more of the multiple new network devices.

25 Claims, 27 Drawing Sheets

US 9,686,682 B2

Page 2

(51) Int. Cl.
*H04W 12/06* (2009.01)
*H04L 29/08* (2006.01)
*H04W 8/00* (2009.01)
*H04W 76/02* (2009.01)
*H04W 48/18* (2009.01)
*H04W 48/20* (2009.01)
*H04W 4/00* (2009.01)
*H04L 9/00* (2006.01)
*H04W 12/04* (2009.01)

(52) U.S. Cl.
CPC ............ *H04L 67/12* (2013.01); *H04L 67/141* (2013.01); *H04W 4/003* (2013.01); *H04W 4/005* (2013.01); *H04W 8/005* (2013.01); *H04W 48/18* (2013.01); *H04W 48/20* (2013.01); *H04W 76/023* (2013.01); *H04W 76/025* (2013.01); *H04W 12/04* (2013.01)

(58) Field of Classification Search
CPC ............ H04L 2209/80; H04L 63/0492; H04L 63/0876; H04L 67/141; H04L 41/0806
See application file for complete search history.

(56) References Cited

U.S. PATENT DOCUMENTS

| | | | | |
|---|---|---|---|---|
| 7,634,802 B2* | 12/2009 | Chiloyan | ............... | H04W 12/06 713/155 |
| 7,975,140 B2* | 7/2011 | Fedyk | ................... | H04L 9/0833 380/279 |
| 8,244,223 B2* | 8/2012 | Farah | ................... | G06Q 10/103 379/201.02 |
| 8,655,995 B2* | 2/2014 | Elston, III | ......... | H04L 12/2809 370/254 |
| 8,942,170 B1* | 1/2015 | Fang | ....................... | H04W 4/08 370/328 |
| 9,130,928 B2* | 9/2015 | Qiu | ........................ | G06F 21/572 |
| 9,185,066 B2* | 11/2015 | Douillet | ................ | G06Q 10/10 |
| 9,306,809 B2* | 4/2016 | Dawes | .................... | H04L 41/18 |
| 2003/0131129 A1* | 7/2003 | Becker | ................... | H04L 67/104 709/238 |
| 2004/0179502 A1* | 9/2004 | Naghian | ................. | H04L 63/08 370/338 |
| 2006/0150241 A1* | 7/2006 | Huh | .......................... | H04L 9/32 726/4 |
| 2006/0168647 A1* | 7/2006 | Chiloyan | ............ | H04L 63/0853 726/4 |
| 2006/0212938 A1* | 9/2006 | Suzuki | .................... | H04L 63/08 726/16 |
| 2007/0027964 A1* | 2/2007 | Herrod | ................ | H04L 41/0889 709/220 |
| 2007/0079113 A1* | 4/2007 | Kulkarni | ............ | H04L 63/0492 713/150 |
| 2007/0170238 A1* | 7/2007 | Piersol | ................. | H04L 63/104 235/375 |
| 2008/0070495 A1* | 3/2008 | Stricklen | ................ | H04W 8/22 455/3.01 |
| 2008/0089300 A1* | 4/2008 | Yee | ..................... | H04W 76/025 370/338 |
| 2008/0141347 A1* | 6/2008 | Kostiainen | ................ | H04L 9/32 726/4 |
| 2009/0052667 A1* | 2/2009 | Iwamura | ............ | H04L 12/2809 380/200 |
| 2009/0070436 A1* | 3/2009 | Dawes | ................... | G06Q 30/02 709/219 |
| 2009/0070681 A1* | 3/2009 | Dawes | ............. | G06F 17/30873 715/736 |
| 2009/0195402 A1* | 8/2009 | Izadi | .................. | H04W 76/023 340/686.6 |
| 2010/0081375 A1* | 4/2010 | Rosenblatt | ............. | G08C 17/02 455/41.1 |
| 2010/0095359 A1* | 4/2010 | Gordon | ................. | H04W 12/06 726/6 |
| 2010/0250946 A1* | 9/2010 | Korte | .................. | H04L 63/0823 713/175 |
| 2011/0081860 A1* | 4/2011 | Brown | ............... | H04N 1/00347 455/41.3 |
| 2011/0144773 A1* | 6/2011 | Van Herk | .......... | G05B 19/0421 700/18 |
| 2011/0148567 A1* | 6/2011 | Lafond | ................... | H04L 67/12 340/4.3 |
| 2011/0307694 A1* | 12/2011 | Broustis | ............... | H04L 63/065 713/163 |
| 2012/0240191 A1* | 9/2012 | Husney | ................. | H04W 12/06 726/3 |
| 2012/0246294 A1* | 9/2012 | Eaton | ..................... | H04W 48/20 709/224 |
| 2013/0035067 A1* | 2/2013 | Zhang | ..................... | H04L 63/08 455/411 |
| 2013/0094538 A1* | 4/2013 | Wang | ..................... | H04B 1/707 375/141 |
| 2013/0132541 A1* | 5/2013 | Falk | ....................... | G06Q 10/087 709/222 |
| 2013/0185368 A1* | 7/2013 | Nordstrom | .............. | H04L 51/32 709/206 |
| 2013/0191897 A1* | 7/2013 | Lindteigen | .............. | G06F 21/44 726/6 |
| 2013/0215467 A1* | 8/2013 | Fein | ....................... | G06F 3/1204 358/1.15 |
| 2013/0272186 A1* | 10/2013 | Mohanty | ................. | H04W 4/06 370/312 |
| 2013/0318343 A1* | 11/2013 | Bjarnason | ........... | H04L 41/0809 713/157 |
| 2013/0326594 A1* | 12/2013 | Hanson | ............... | H04L 63/0853 726/4 |
| 2014/0005810 A1* | 1/2014 | Frei | ...................... | H04L 29/1249 700/90 |
| 2014/0059351 A1* | 2/2014 | Braskich | ................. | G06F 21/36 713/171 |
| 2014/0093079 A1* | 4/2014 | Scott | ....................... | H04L 63/08 380/270 |
| 2014/0167929 A1* | 6/2014 | Shim | ...................... | G08C 17/02 340/12.5 |
| 2014/0241354 A1* | 8/2014 | Shuman | ................ | H04L 67/16 370/390 |
| 2014/0282257 A1* | 9/2014 | Nixon | ..................... | G05B 11/01 715/835 |
| 2014/0289833 A1* | 9/2014 | Briceno | ................ | H04L 63/08 726/7 |
| 2014/0351312 A1* | 11/2014 | Lu | ........................ | H04W 4/005 709/201 |
| 2014/0369232 A1* | 12/2014 | Kim | ...................... | H04W 60/00 370/254 |
| 2015/0023183 A1* | 1/2015 | Ilsar | .................... | H04W 48/16 370/244 |
| 2015/0026317 A1* | 1/2015 | Ilsar | .................... | H04L 41/0816 709/221 |
| 2015/0072677 A1* | 3/2015 | Yang | ..................... | H04W 8/12 455/432.3 |
| 2015/0113592 A1* | 4/2015 | Curtis | ................ | H04L 63/0823 726/2 |
| 2015/0133051 A1* | 5/2015 | Jamal-Syed | ........ | H04M 1/7253 455/41.2 |
| 2015/0245204 A1* | 8/2015 | Heydon | ............... | H04L 43/0817 713/171 |
| 2015/0282216 A1* | 10/2015 | Reshef | ................... | H04W 8/005 455/39 |
| 2016/0044032 A1 | 2/2016 | Kim et al. | | |
| 2016/0081133 A1 | 3/2016 | Kim et al. | | |

OTHER PUBLICATIONS

Jehangir, Assed, and Sonia M. Heemstra De Groot. "Securing personal network clusters." Security and Privacy in Communications Networks and the Workshops, 2007. SecureComm 2007. Third International Conference on. IEEE, 2007.*

Thomas, David, and Egil Hansen. "Thingies for Dummies: A smart home infrastructure for the rest of us.", 2012.*

(56) References Cited

OTHER PUBLICATIONS

Yang, Jeonghwa, and W. Keith Edwards. "ICEbox: toward easy-to-use home networking." Human-Computer Interaction—INTERACT 2007. Springer Berlin Heidelberg, 2007. 197-210.*
First Action Interview Pilot Program Pre-Interview Communication of Nov. 25, 2015 for U.S. Appl. No. 14/455,940, 5 pages.
Notice of Allowance of May 11, 2016 for U.S. Appl. No. 14/455,940, 15 pages.

* cited by examiner

SETUP OF MULTIPLE IOT NETWORK DEVICES

CROSS-REFERENCE TO RELATED APPLICATIONS

This application is a continuation of U.S. application Ser. No. 14/455,940 filed Aug. 10, 2014, which is hereby incorporated by reference in its entirety.

FIELD

The present disclosure relates to setup of multiple IoT network devices. Specifically, various techniques and systems are provided for setup of multiple similar IoT devices at substantially the same time using joint authentication.

BRIEF SUMMARY

Embodiments of the present invention are directed to a computer-implemented method. The method includes receiving, at an existing network device on a network, one or more communications, wherein the one or more communications include an indication that multiple new network devices are associated with the network; receiving an indication that the multiple new network devices have each generated a setup access point; establishing a connection with the setup access point of each of the multiple new network devices; receiving identification information, wherein the identification information includes information identifying each of the multiple new network devices; and transmitting the identification information identifying each of the multiple new network devices, wherein when the identification information is received, the identification information facilitates generating one or more authentication queries to authenticate one or more of the multiple new network devices.

Alternative embodiments of the present invention are directed to a computing device. The computing device includes one or more processors, and a memory having instructions stored thereon, which when executed by the one or more processors, cause the computing device to perform operations. The operations include receiving, at an existing network device on a network, one or more communications, wherein the one or more communications include an indication that multiple new network devices are associated with the network; receiving an indication that the multiple new network devices have each generated a setup access point; establishing a connection with the setup access point of each of the multiple new network devices; receiving identification information, wherein the identification information includes information identifying each of the multiple new network devices; and transmitting the identification information identifying each of the multiple new network devices, wherein when the identification information is received, the identification information facilitates generating one or more authentication queries to authenticate one or more of the multiple new network devices.

Alternative embodiments of the present invention include a non-transitory computer-readable storage medium having instructions stored thereon, which when executed by a computing device, cause the computing device to receive, at an existing network device on a network, one or more communications, wherein the one or more communications include an indication that multiple new network devices are associated with the network; receive an indication that the multiple new network devices have each generated a setup access point; establish a connection with the setup access point of each of the multiple new network devices; receive identification information, wherein the identification information includes information identifying each of the multiple new network devices; and transmit the identification information identifying each of the multiple new network devices, wherein when the identification information is received, the identification information facilitates generating one or more authentication queries to authenticate one or more of the multiple new network devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
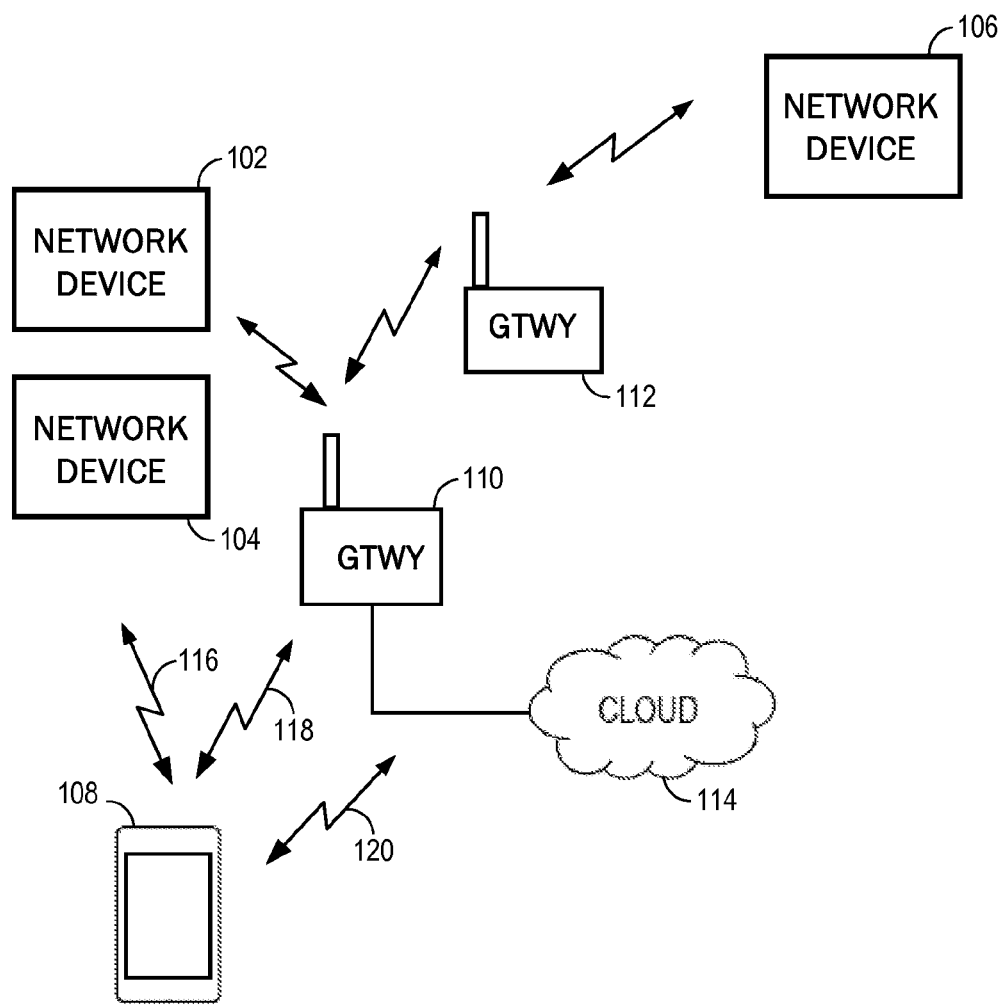
FIG. 1 illustrates an example of a wireless network environment, according to embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or the like), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LIE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WIFI™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
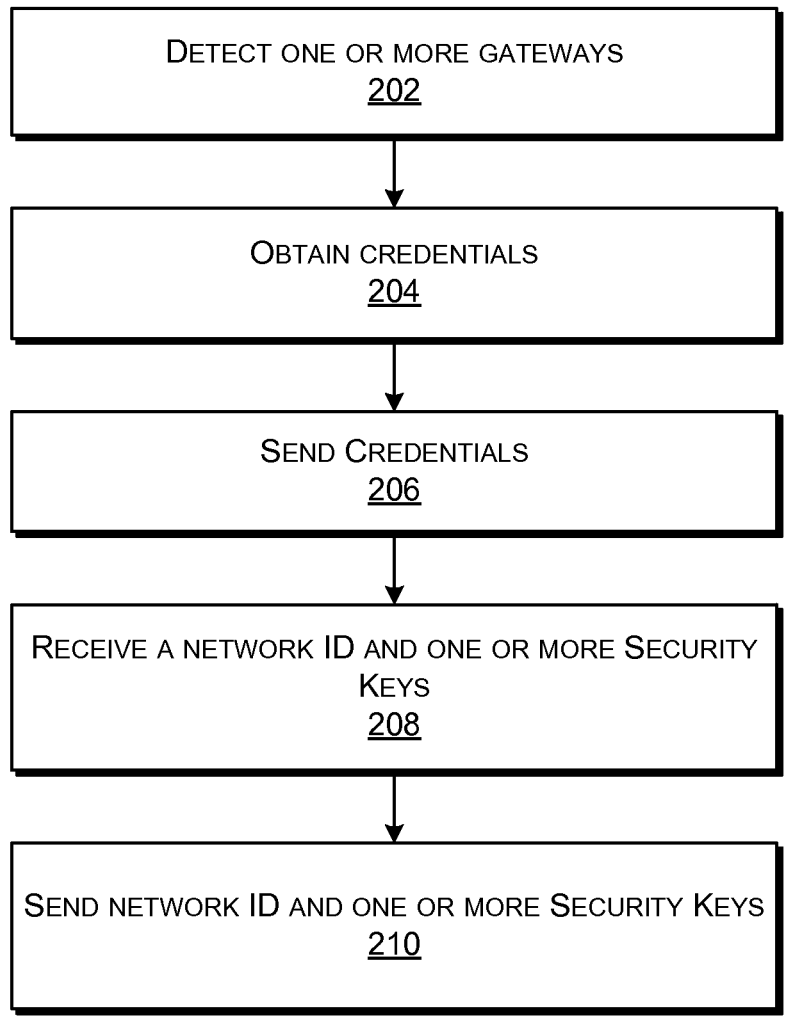
FIG. 2 is a flowchart illustrating an embodiment of a process for registering one or more network devices, according to embodiments of the present invention.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signaL The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
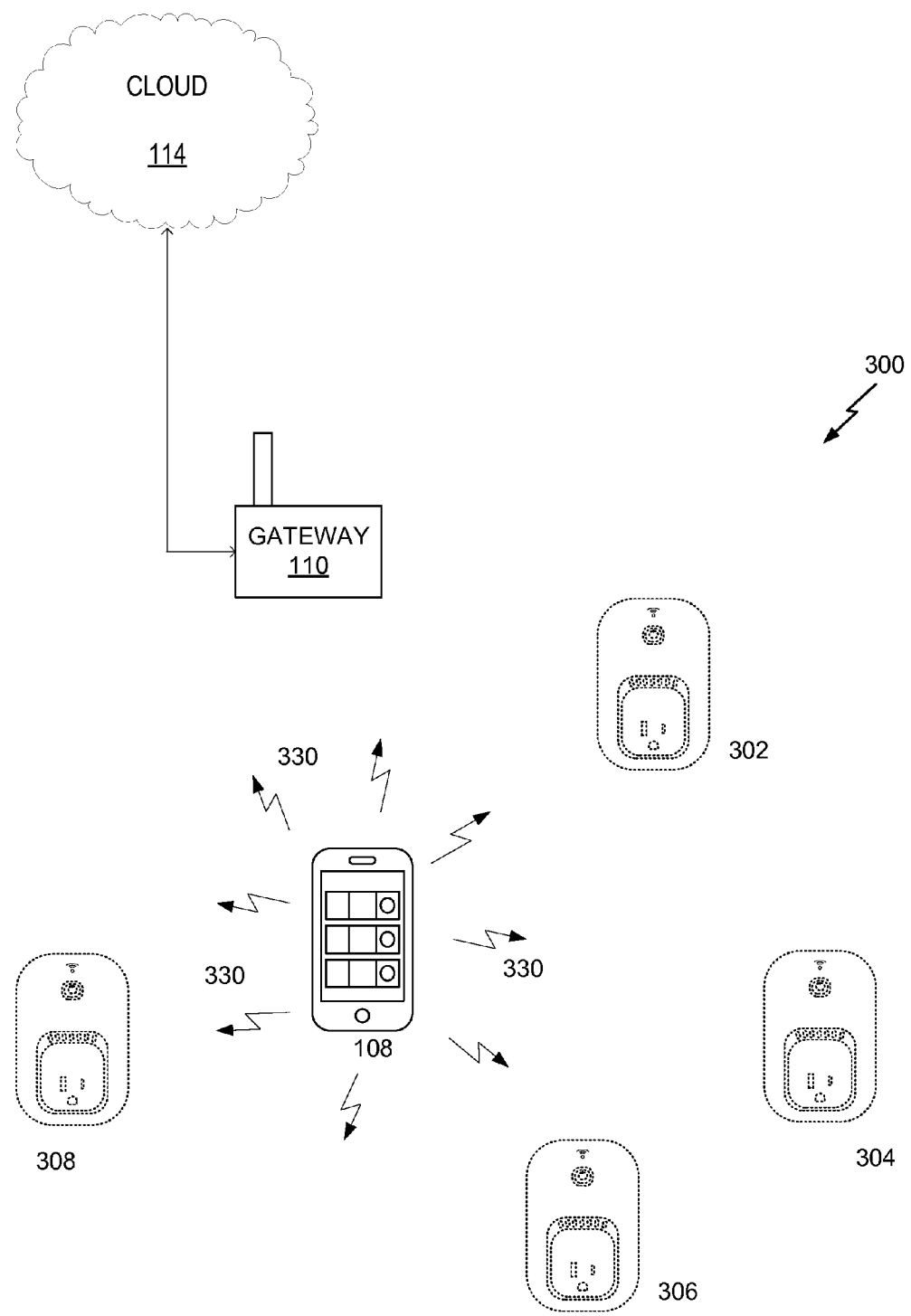
FIG. 3 illustrates an example of a network environment, according to embodiments of the present invention.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
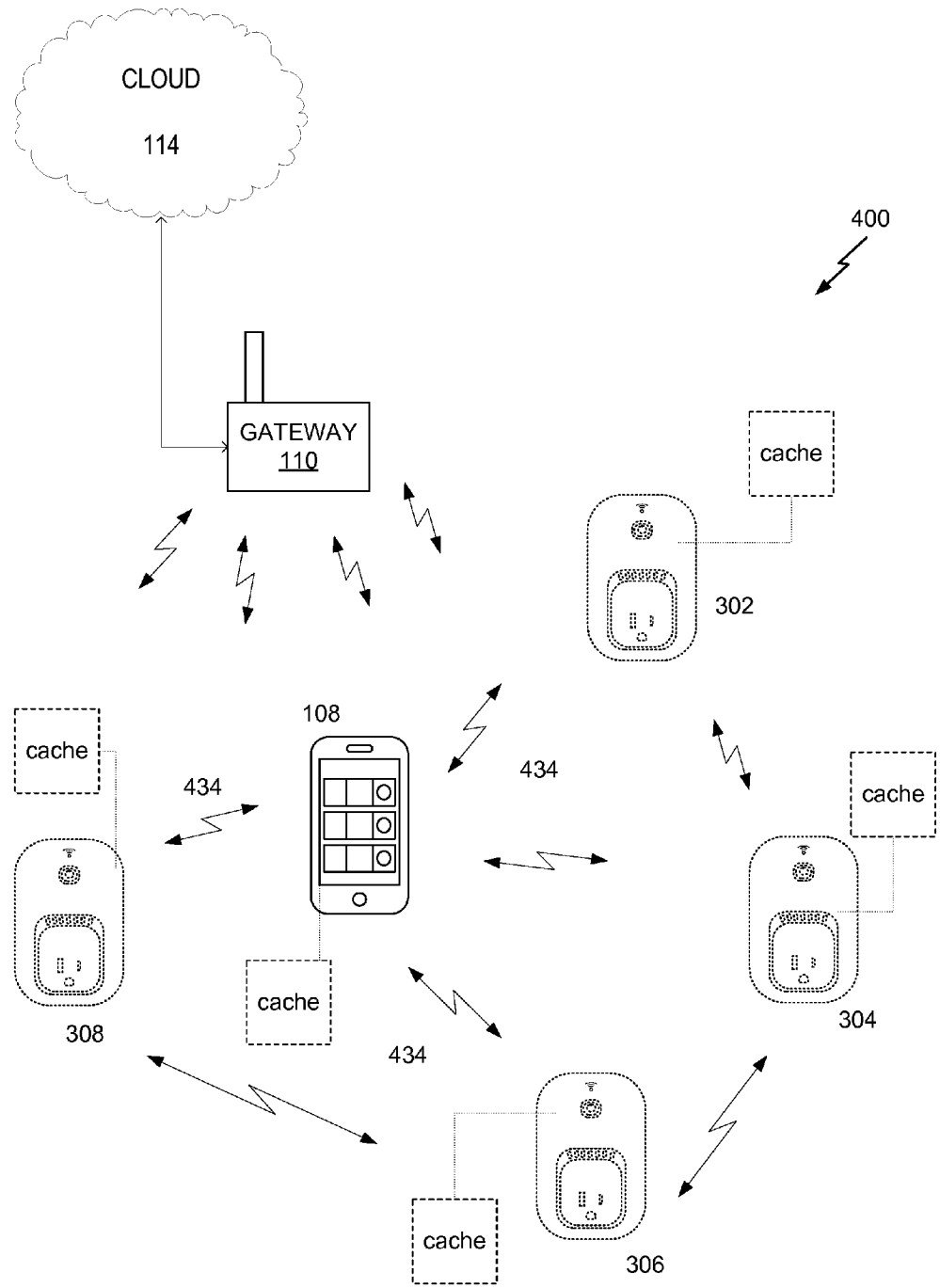
FIG. 4 illustrates an example of a network environment, according to embodiments of the present invention.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
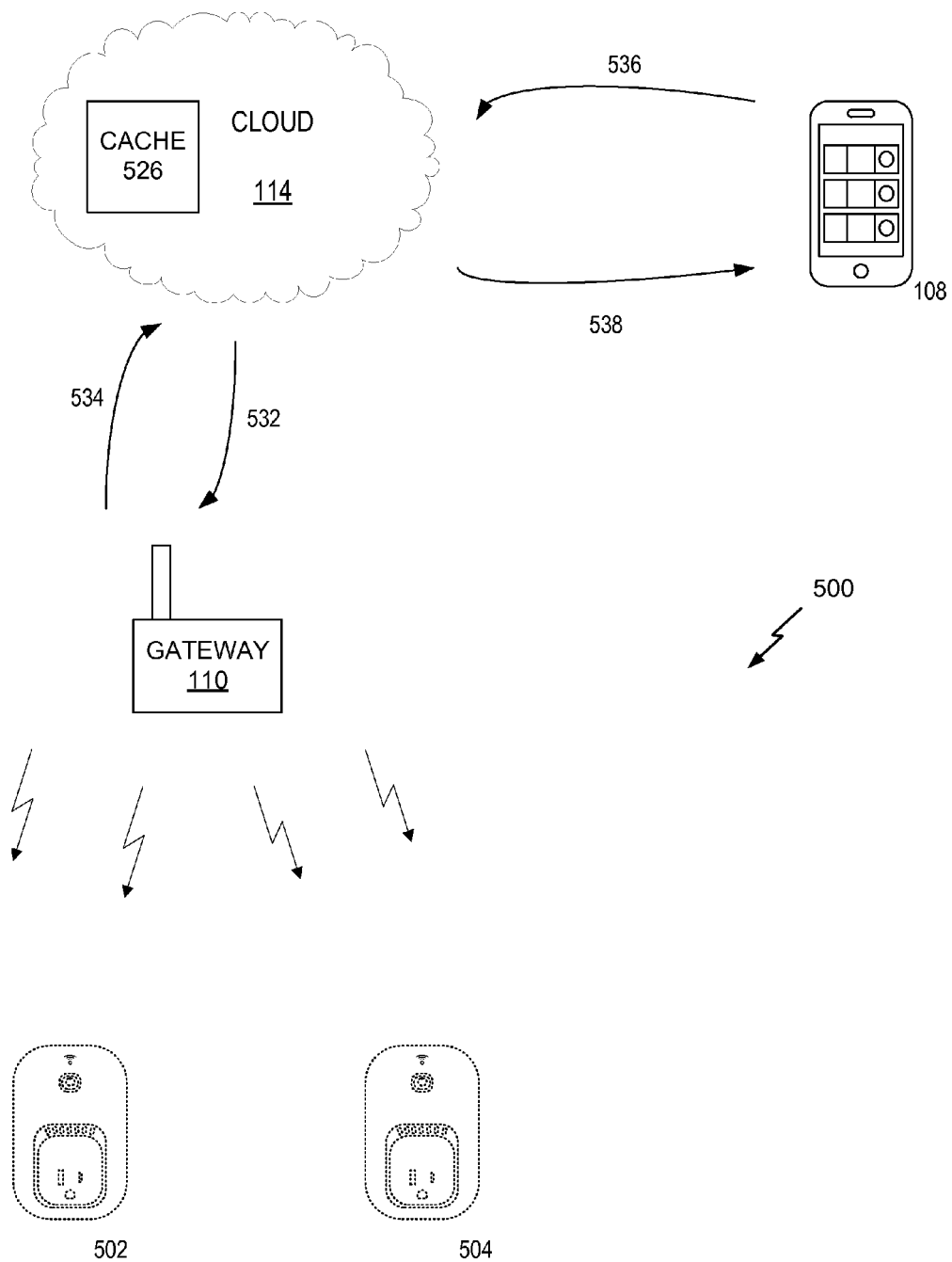
FIG. 5 illustrates an example of a network environment, according to embodiments of the present invention.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the Internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Techniques and systems are described herein for setup of multiple IoT network devices. Specifically, various techniques and systems are provided for setup of multiple similar (or, in other embodiments, disparate) IoT devices at substantially the same time using joint authentication. For example, multiple new network devices may generate setup access points at substantially the same time and attempt to join a local area network. A device on the network may detect communications from the new devices including a request to join the network and/or identification information. The device may then connect to the new network devices in various different ways to receive such identifying information, and may authenticate the network devices at substantially the same time before allowing the new devices to join the network. The existing network device may also use other existing network devices or may use communication between new network devices to facilitate the process of authenticating and joining the new network devices on to the network. Exemplary embodiments of the present invention are described herein.

Figure 6:
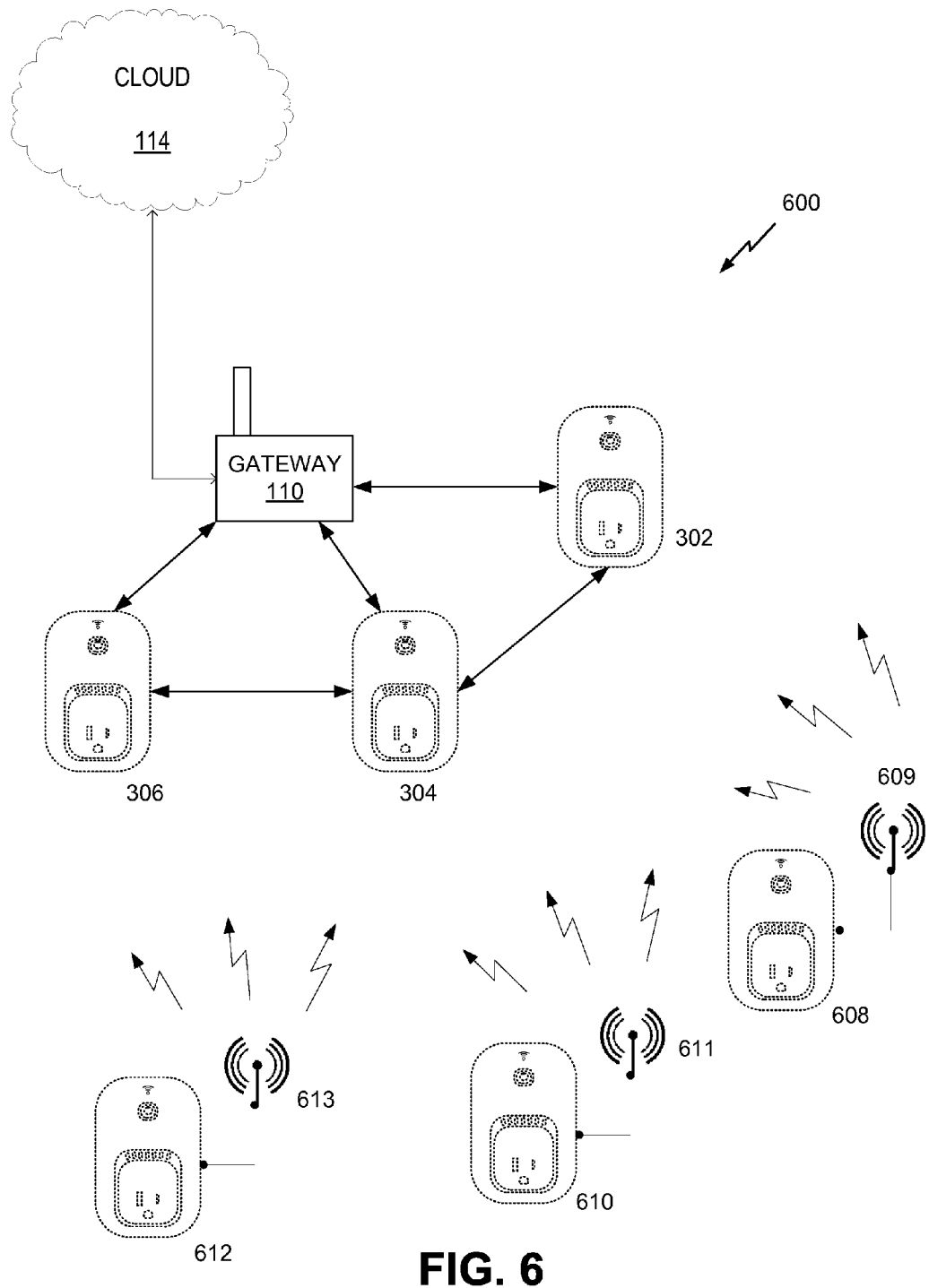
FIG. 6 illustrates an example of a local area network including a gateway and three network devices, according to embodiments of the present invention.

FIG. 6 illustrates an example of a local area network 600 including a gateway and three network devices, according to embodiments of the present invention. The local area network 600 includes network devices 302, 304 and 306. However, network 600 may include more or less network devices at any given time. Also included in FIG. 6 is new network devices 608, 610 and 612.

New network device 608 is connected to (or includes) setup access point 609, new network device 610 is connected to (or includes) setup access point 611, and new network device 612 is connected to (or includes) setup access point 613. A setup access point (e.g. wireless access point), such as setup access points 609, 611 and 613, allows wireless devices to connect to a network using WiFi, Zigbee, near field communication, or other standards. Identification information may be sent from one of the new network devices to gateway 110 via the network device's setup access point. The identification information may also be sent as an automatic component of being powered on for the first time or reset of the new network device. In some cases, the identification information may include a name of the network device or other information identifying the network device. The identification may be sent directly to the gateway, may be sent to the gateway via another gateway or network device, may be sent to the gateway via a cloud network connected to both the network device and the gateway, among other methods of communication.

New network devices 608, 610 and 612 may be turned/powered on at the same time or at substantially the same time. For example, new network devices 608, 610 and 612 may be powered on within 30 seconds, 1 minute, 2 minutes, 5 minutes, etc. of each other. After one or more of the new network devices are turned on near local area network 600, network devices 608, 610 and 612 may transmit a notification or other indication of their presence. The notifications may include identification information or other information identifying the network device that has been powered on. The notifications may also include a request to join the network. Alternatively, new network devices 608, 610 and 612 may send a separate communication including a request to join the network.

The notifications/indications sent from the new network devices may be in the form of beacons containing various information, including identification information of the device, identification information of the network, a timestamp, information indicating network bandwidth/latency or other capability information, among other information. Furthermore, beacon frames may be transmitted periodically to announce the presence of the network device.

Because network devices 608, 610 and 612 may be powered on at substantially the same time or within seconds or minutes of each other, a device that is already on the network, such as one or more of network device 302, network device 304, and network device 306, may receive the notifications/beacons from the new network devices 608, 610 and 612, including requests from the new network devices 608, 610 and 612 to join the network, at substantially the same time. Subsequently, one or more of network devices 302, 304 and 306 may connect to new network devices 608, 610 and 612. For example, one or more of network devices 302, 304 and 306 may generate a communication connection/path with one or more of new network devices 608, 610 and 612. Furthermore, before allowing new network devices 608, 610 and 612 to communicate with gateway 110 and/or network devices already on the network, the network or a device on the network may authenticate new network devices 608, 610 and 612 to confirm that the new network devices are allowed/desired to join the network. Example authentication methods are described herein with respect to FIGS. 1 and 2.

Figure 7:
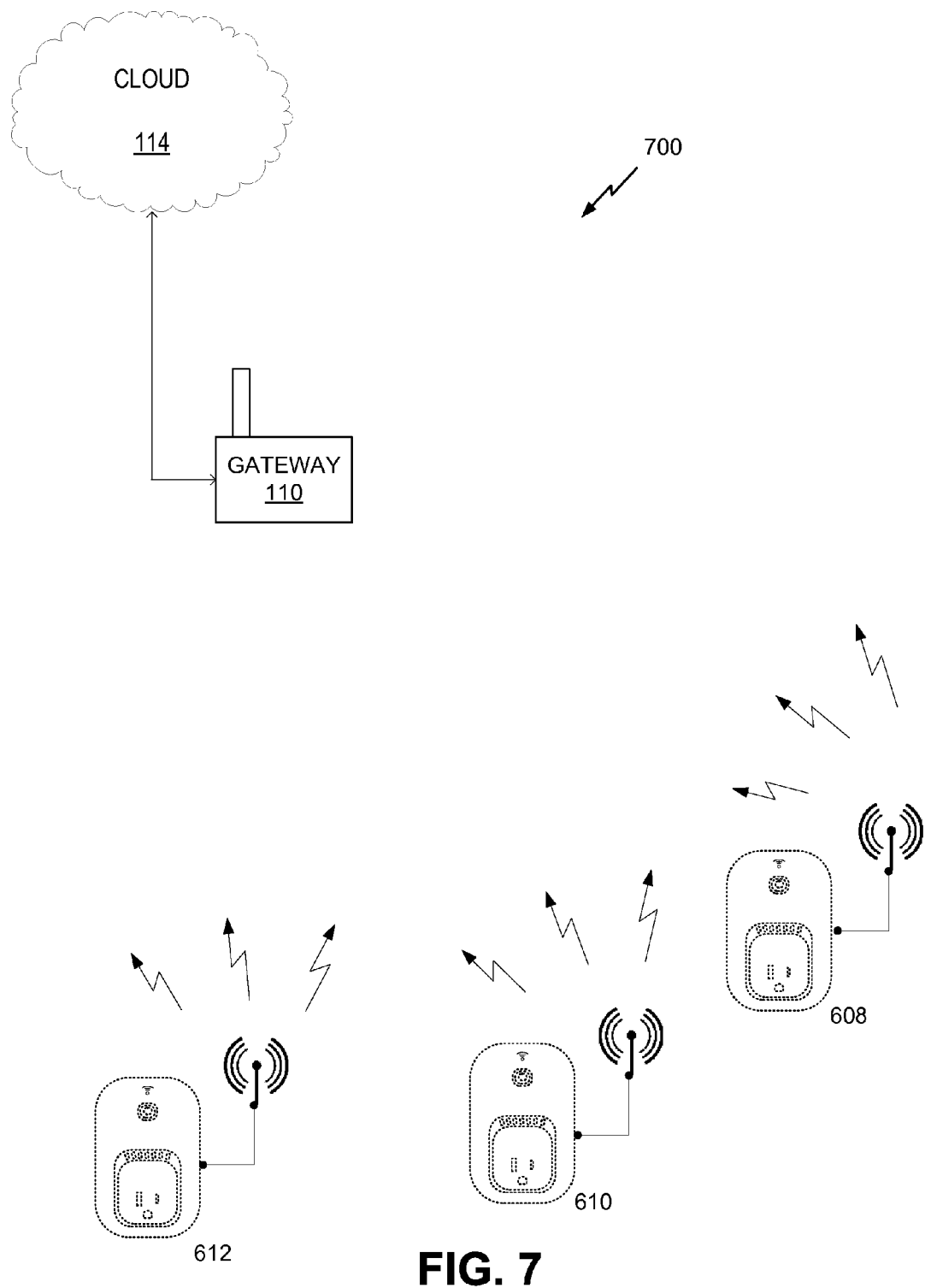
FIG. 7 illustrates an example of a local area network including a gateway, according to embodiments of the present invention.

Gateway 110 may facilitate the process of connecting the new network devices 608, 610 and 612 to the network. For example, as shown in FIG. 7, the network 700 may not include network devices already connected to the network, such as network devices 302, 304 and 306 as shown in FIG. 6. New network devices 608, 610 and 612 may be turned/powered on at the same time or at substantially the same time. After one or more of the new network devices are turned on near local area network 600, network devices 608, 610 and 612 may transmit a notification or other indication of their presence. The notifications may include identification information or other information identifying the network device that has been powered on. Gateway 110 may receive the notifications/beacons from the new network devices 608, 610 and 612, including requests from the new network devices 608, 610 and 612 to join the network. Gateway 110, similar to the network devices 302, 304 and/or 306 in FIG. 6, may receive such notifications/requests from the new network devices at substantially the same time. Subsequently, gateway 110 may connect to new network devices 608, 610 and 612, as shown for example in FIG. 12. For example, gateway 110 may generate a communication connection/path with one or more of new network devices 608, 610 and 612. Furthermore, before allowing new network devices 608, 610 and 612 to communicate with gateway 110 and/or network devices already on the network, the network or a device on the network may authenticate new network devices 608, 610 and 612 to confirm that the new network devices are allowed/desired to join the network.

Figure 8:
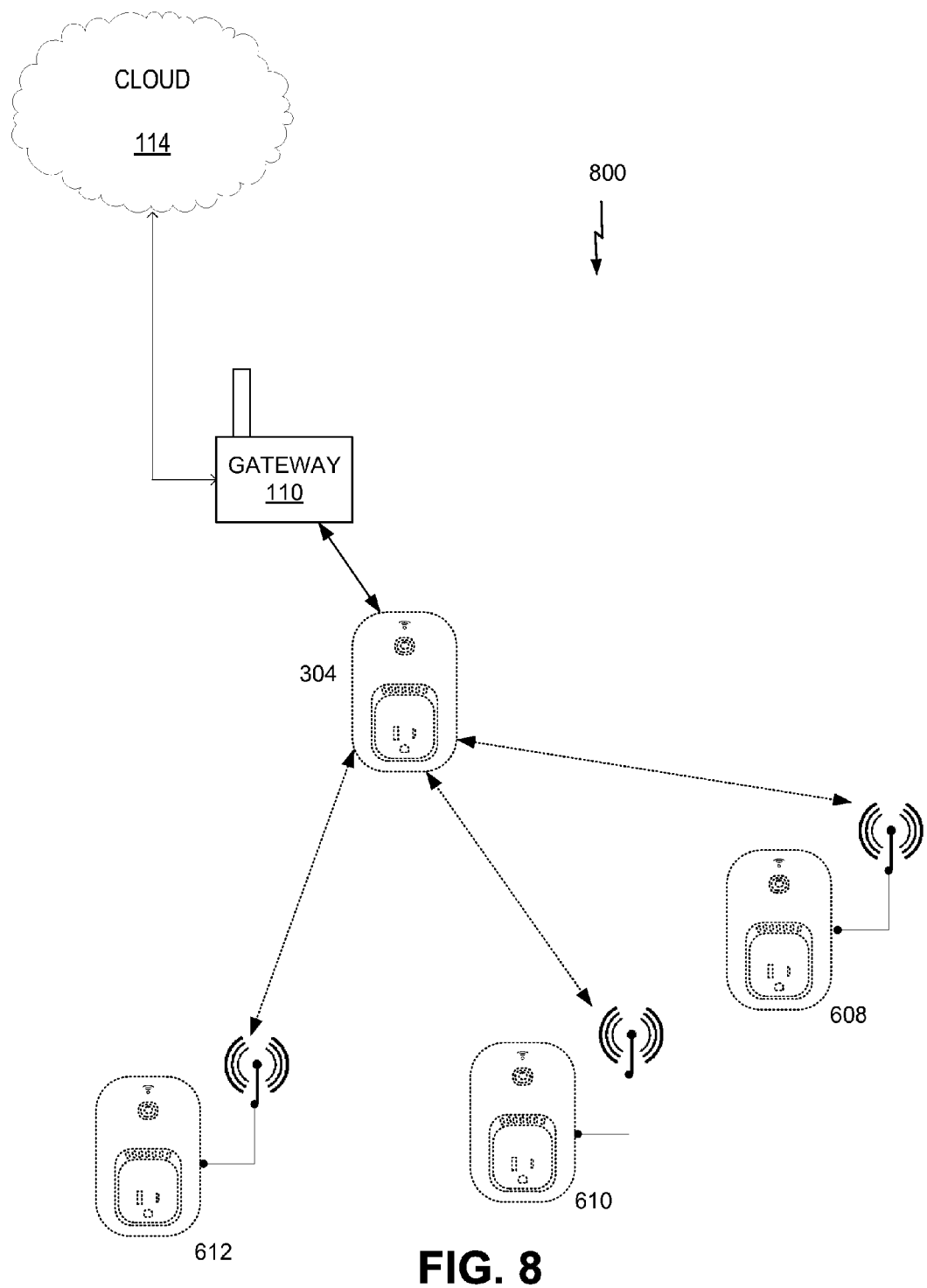
FIG. 8 illustrates an example of a local area network including a gateway and a network device connected to three new network devices, according to embodiments of the present invention.

FIG. 8 illustrates an example of a local area network 800 including a gateway and a network device connected to three new network devices, according to embodiments of the present invention. As noted, network devices 608, 610 and 612 may generate setup access points that an existing network device (e.g. 304) or gateway (e.g. gateway 110) may connect to in order to adopt or connect with the network devices. The network device 304 may connect to the setup access points of new network devices 608, 610 and 612, as shown in FIG. 8. In other words, network device 304 may communicate with new network devices 608, 610 and 612 (e.g. via their setup access points). For example, as noted, network device 304 may transmit a request/query to new network devices 608, 610 and 612 to obtain identification information from new network devices 608, 610 and 612. Identification information may include any information/data that identifies the network device, such as the network device's SSID, MAC address, serial number, defining characteristic or functionality, among others.

In an alternative embodiment, gateway 110 or an existing network device, such as device 304, may generate a setup access point (instead of or in addition to, for example, a new network device). For example, gateway 110 or device 304 may generate such an access point and then leave it on such that it may scan for new network devices to allow such new network devices to connect to it. The new network device may also open a setup access point, and gateway 110 or device 304 may connect to its setup access point to, for example, receive its identification information.

Figure 9:
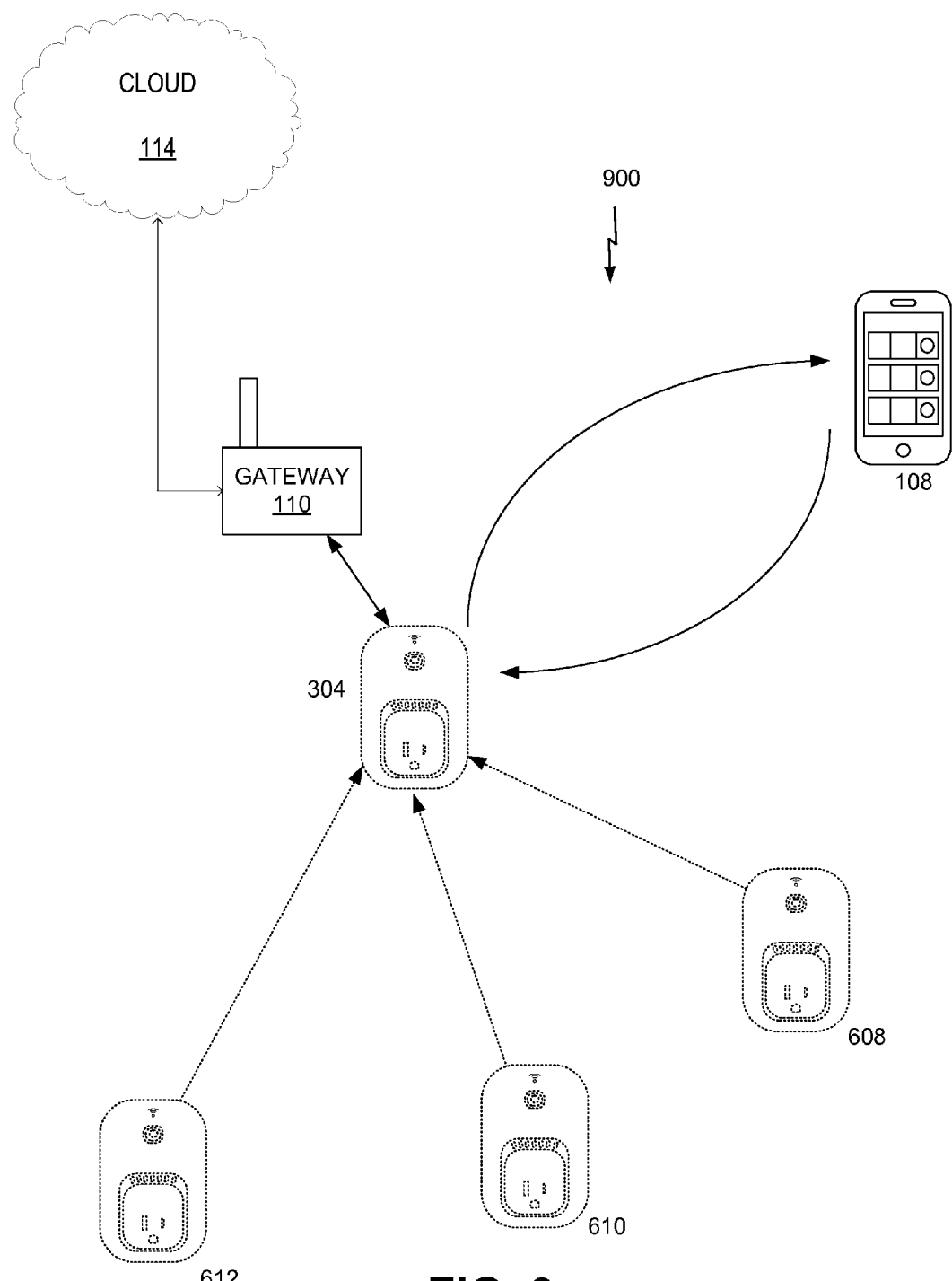
FIG. 9 illustrates an example of a local area network including a gateway and a network device connected to three new network devices and an access device, according to embodiments of the present invention.

FIG. 9 illustrates an example of a local area network 900 including a gateway and a network device connected to three new network devices, according to embodiments of the present invention. FIG. 9 also illustrates an access device 108 in communication with network device 304. After network device 304 searches for, finds, and connects to new network devices 608, 610 and 612 (e.g. via their setup access points), new network devices 608, 610 and 612 may transmit identification information (and possibly other information) to network device 304. Network device 304 may then aggregate the identification information received from new network devices 608, 610 and 612 into a single data set, table, database, or other data aggregation/storage medium.

The network device (or any other device to aggregate such information) may perform analysis on the identification information. For example, the identification information may be analyzed to determine common functions, characteristics, or other identifying features of each of the network devices for which identification information was received. Analysis may also be performed to find common capabilities or functions of the network devices, or other comparison data points between the network devices' identifications.

Although network device 304 may be connected to new network devices 608, 610 and 612 such that network device 304 may receive identification information from new network devices 608, 610 and 612, new network devices 608, 610 and 612 may not have joined network 900 such that new network devices 608, 610 and 612 may be free to communicate with gateway 110 and other devices on the network. More specifically, network device 304 may generate/establish a connection with new network devices 608, 610 and 612 (e.g. via their setup access points), but not allow them to join the network until new network devices 608, 610 and 612 have been authenticated to join the network. For example, network device 304 (or gateway 110) may authenticate new network devices 608, 610 and 612, by confirming that new network devices 608, 610 and 612 are allowed to join the network, after network device 304 (or gateway 110) receives a request to join the network from new network devices 608, 610 and 612.

There are several ways in which network device 304 may authenticate new network devices 608, 610 and 612. For example, network device 304 may transmit the (e.g. aggregated) identification information received from new network devices 608, 610 and 612 to access device 108. Once the identification information (which is associated with new network devices 608, 610 and 612) is received from network device 304, access device 108 may use the identification information to generate one or more authentication queries to authenticate one or more of new network devices 608, 610 and 612. More specifically, access device 108 may display the identification information to the display/interface of access device 108 such that the identification information will be presented to a user of the access device. The identification information of new network devices 608, 610 and 612 may be presented as received by network device 304 from new network devices 608, 610 and 612 or may be manipulated to be presented in a user-friendly manner. For example, the identification information may be presented in a list of new network devices so as to allow the user to select the network devices that the user wishes to authenticate to join the network. Specific examples of user interface displays of access device 108 are described and shown further with respect to FIGS. 19 and 20.

After the identification information of new network devices 608, 610 and 612 is displayed at a user interface of access device 108, access device 108 may receive inputs from a user of the access device indicating one or more answers to the query or queries related to authentication of new network devices 608, 610 and 612. For example, a user may select certain devices of new network devices 608, 610 and 612 to authenticate, may select all of new network devices 608, 610 and 612 to authenticate, or may select none of new network devices 608, 610 and 612 to authenticate. Upon selecting one or more new network devices 608, 610 and 612 to authenticate, access device 108 may transmit one or more communications or responses to the queries/requests from network device 304 indicating which of new network devices 608, 610 and 612 have been authenticated to join the network. The user may select the network devices to authenticate and also select a "send" or "submit" button on access device 108, or access device 108 may send responses to network device 304 immediately upon receiving inputs from the user.

A user may also select an option for gateway 110 to not require authentication to allow a device, such as new network devices 608, 610 and 612, to join network 1000. For example, gateway 110 may include settings such that gateway 110 may allow, without authentication, any device or a subset of all devices to connect to gateway 110 and/or join network 1000.

Other methods are possible to authenticate new network devices 608, 610 and 612 before they are allowed to join the network. For example, existing network device 304 or gateway 110 may have previously stored authentication information related to new network devices 608, 610 and/or 612. For example, cloud network 114 may have transmitted/sent information related to new network devices 608, 610 and 612 to gateway 110, which gateway 110 may have then transmitted to network device 304. Such information, received by gateway 110, may include pre-provisioning/authentication information indicating to gateway 110 (and network device 304) that new network devices 608, 610 and 612 are allowed to join local area network 1000. Cloud 114 may have previously received this pre-authentication information from a user (e.g. via access device 108). Therefore, gateway 110 or existing network device 304 may query an internal storage device or elsewhere within the network to confirm that new network devices 608, 610 and 612 are authenticated to join the network 1000.

In another alternative embodiment, network device 304 may send/transmit a query to external cloud network 114 including a request for external cloud 114 to indicate to gateway 110 whether network device 502 should be allowed/authenticated to join the network 1000. External cloud network 114 may have stored such authentication information because it may have received such information access device 108 or elsewhere previously. External cloud network 114 may transmit/send a response to the query from network device 304 (or gateway 110) including information indicating whether or not new network devices 608, 610 and 612 are authenticated to join the network.

Figure 10:
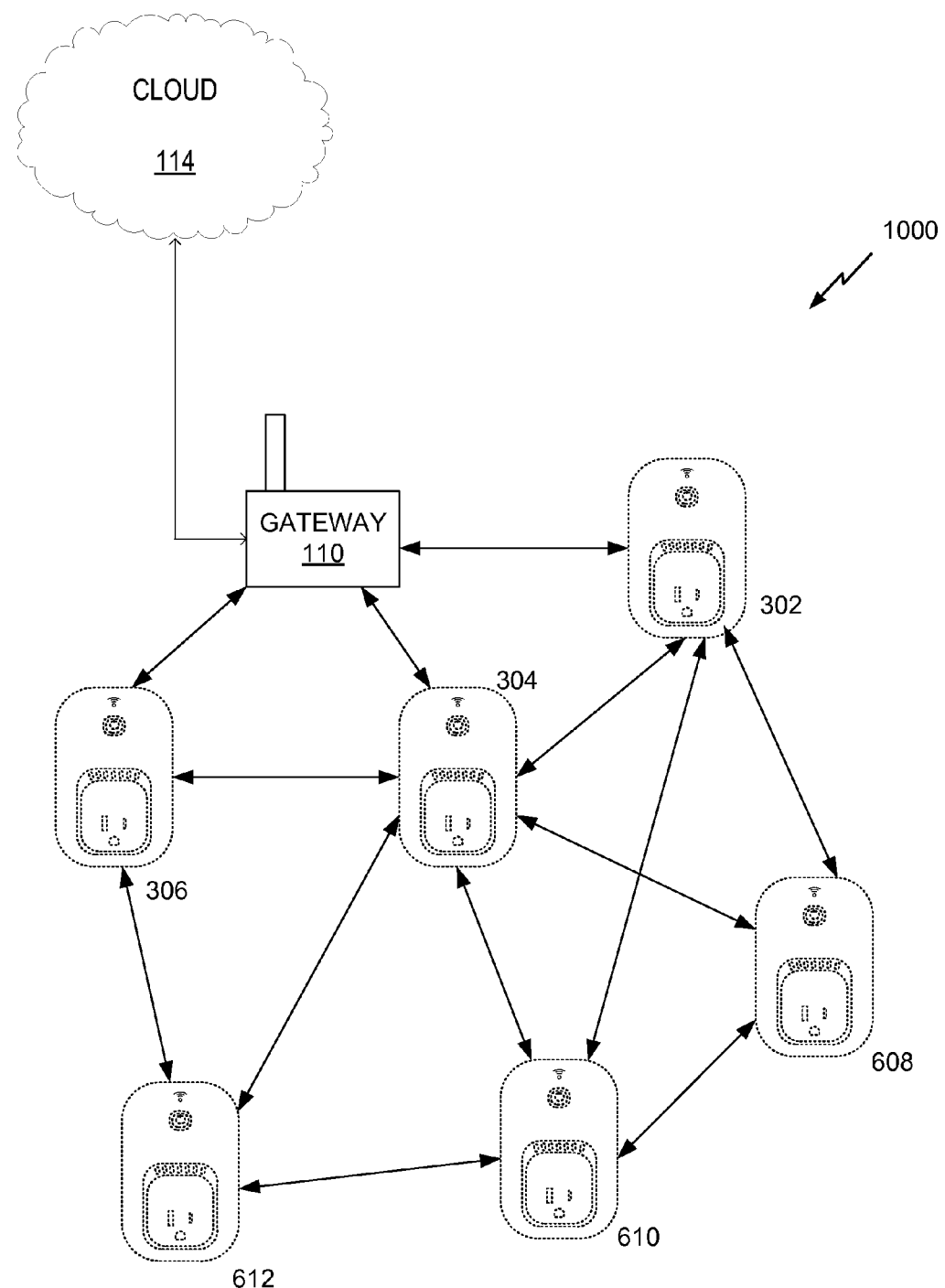
FIG. 10 illustrates an example of a local area network including a gateway and six network devices, according to embodiments of the present invention.

FIG. 10 illustrates an example of a local area network 1000 including a gateway and six network devices, according to embodiments of the present invention. After new network devices 608, 610 and 612 have been authenticated, new network devices 608, 610 and 612 may be connected to or join network 1000. As such, new network devices 608, 610 and 612 may be connected to existing network devices 302, 304 and 306, as well as gateway 110 and external cloud network 114. For example, one or more of network devices 302, 304 and 306 may generate a communication connection/path with one or more of new network devices 608, 610 and 612.

Figure 11:
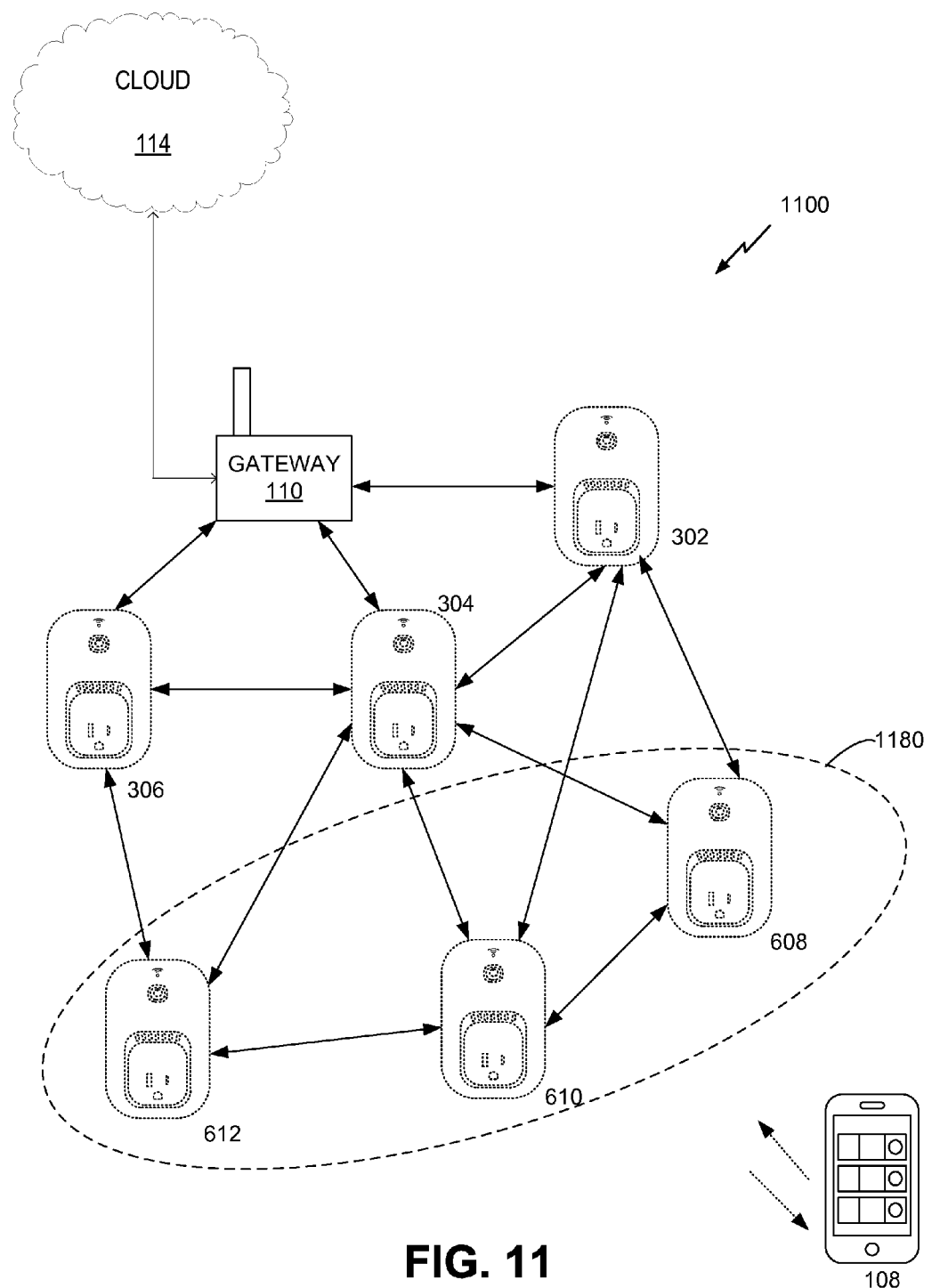
FIG. 11 illustrates an example of a local area network including a gateway and six network devices, according to embodiments of the present invention.

FIG. 11 illustrates an example of a local area network 1100 including a gateway and six network devices, according to embodiments of the present invention. As noted, certain network devices, and any devices that are connected to the network 1000 via the network devices, may be controlled remotely by, for example, an access device, such as access device 108 shown in FIG. 11. If multiple network devices, such as network devices 608, 610 and 612 are powered on and/or attempt to connect to network 1000 at the same time, network devices 608, 610 and 612 may be related to or associated with one another in some way. For example, network devices 608, 610 and 612 may be located in the same room of a building. More specifically, network devices 608, 610 and 612 may each be connected to a light bulb where each of the light bulbs connected to network devices 608, 610 and 612 are located in the same room. Therefore, it may be beneficial for a user to turn on or off the light bulbs connected to network devices 608, 610 and 612 at the same time (or, for example, if network devices 608, 610 and 612 are light bulbs themselves, then it may be beneficial for a user to turn on or off network devices 608, 610 and 612). In order for a user to control such network devices at the same time, the devices may be grouped together in a grouping, such as grouping 1180, such that they are treated within the network as a single virtual device. For example, a user may control grouping 1180, which includes network devices 608, 610 and 612, by pressing one button for all three devices to perform a function instead of having to press one button for each of the devices to perform that function.

As noted with respect to FIG. 7, gateway 110 may facilitate the process of connecting the new network devices 608, 610 and 612 to the network, and the network may not include network devices already connected to the network when new devices connect to the network, such as network devices 302, 304 and 306, as shown in FIG. 6. Therefore, similar to grouping 1180 in FIG. 11, new network devices 608, 610 and 612 may be grouped in a grouping, such as grouping 1280. Similarly, grouping 1280 may be controlled remotely outside the network 1200 via access device 108.

Many reasons may exist why multiple new network devices may be powered on at substantially the same time. For example, a user may purchase multiple light bulbs and plug them in into light sockets over the course of a short period of time. Therefore, in some circumstances, network devices that are powered on at substantially the same time may be multiple devices of the same type. In another example, the user may have gone on a shopping trip and purchased several different devices, some of which may be of different types (e.g. a light switch and a motion sensor and a DVD player). However, the user may arrive home and power on the different devices at substantially the same time soon after arriving home. Therefore, in some circumstances, network devices that are powered on at substantially the same time may be of different types.

Furthermore, although sometimes devices, whether of the same type (e.g. multiple lights) or of different types (e.g. a light and a sensor) may be powered on, and therefore attempt to connect to the network, such as network 1100, at substantially the same time, other devices may be powered on and connect to the network at different times. For example, network devices 302, 304 and 306 had already been connected to network 600 by the time new network devices 608, 610 and 612 attempted to join network 1100. A user may start a network by purchasing a gateway and network devices to connect to the network, and then at a later time purchase more network devices and/or more gateways to connect to the network and the existing network devices and gateway(s) on the network. Similarly, certain devices may be included in a group, such as group 1280 in FIG. 12, and other devices may be added to the group at a later time. For example, if one or more of network devices 302, 304 and 306 are in a device group and, as shown in FIG. 11, network devices 608, 610 and 612 are later added to network 1100, one or more of devices 608, 610 and 612 may be added to the existing group including one or more of devices 302, 304 and 306. Furthermore, one or more of new network devices 608, 610 and 612 may be included a new group, such as group 1280.

Figure 12:
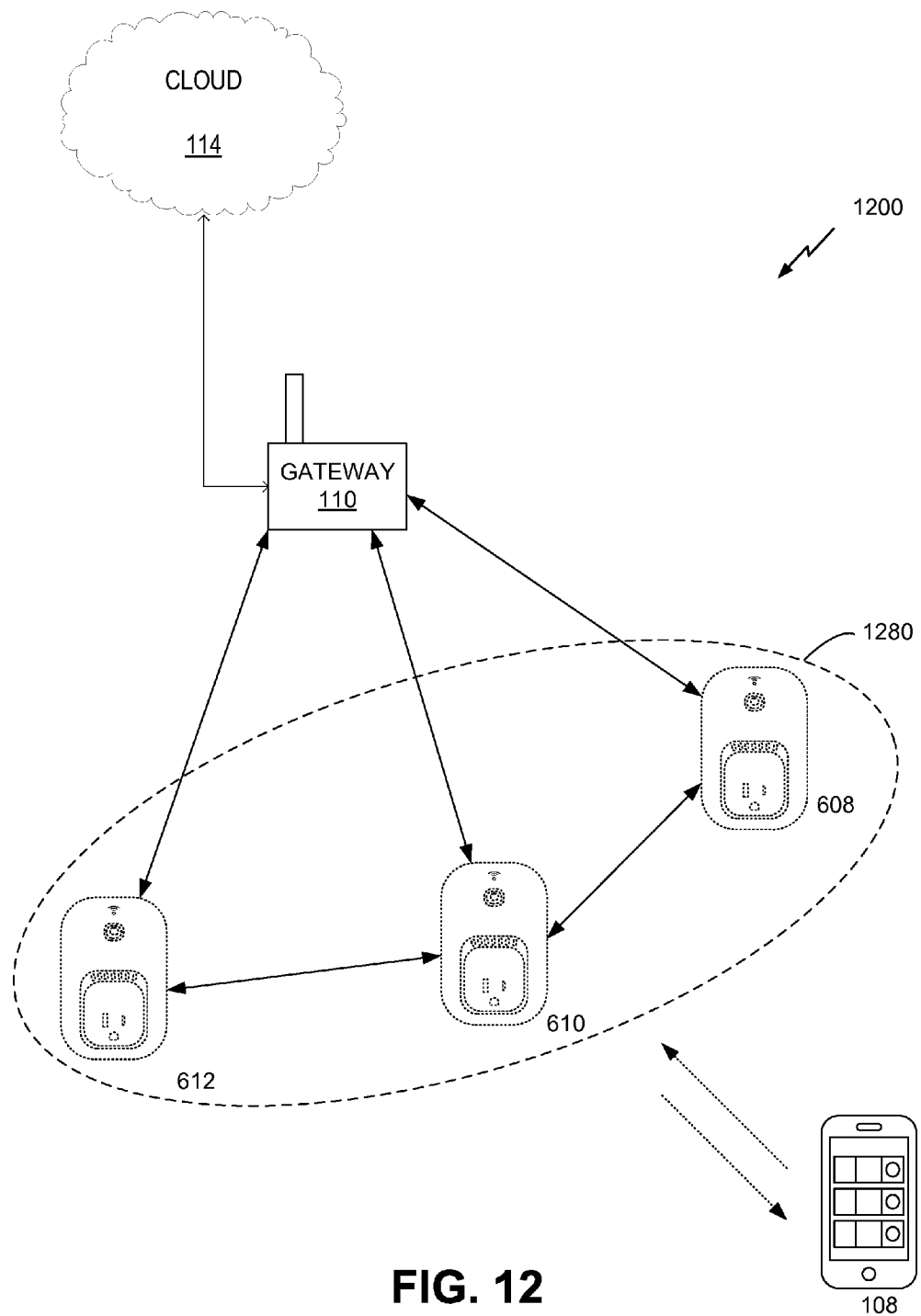
FIG. 12 illustrates an example of a local area network including a gateway and three network devices, according to embodiments of the present invention.

As shown in FIGS. 11-12, network devices that are of the same type (e.g. a plurality of light bulbs) may be grouped together. For example, a set or group of light bulbs may have the same functionality. More specifically, a set of lights may include the single two-way functionality of turning on and off. However, as shown in FIG. 13, devices of different or disparate types may also be grouped together into device groups.

Figure 13:
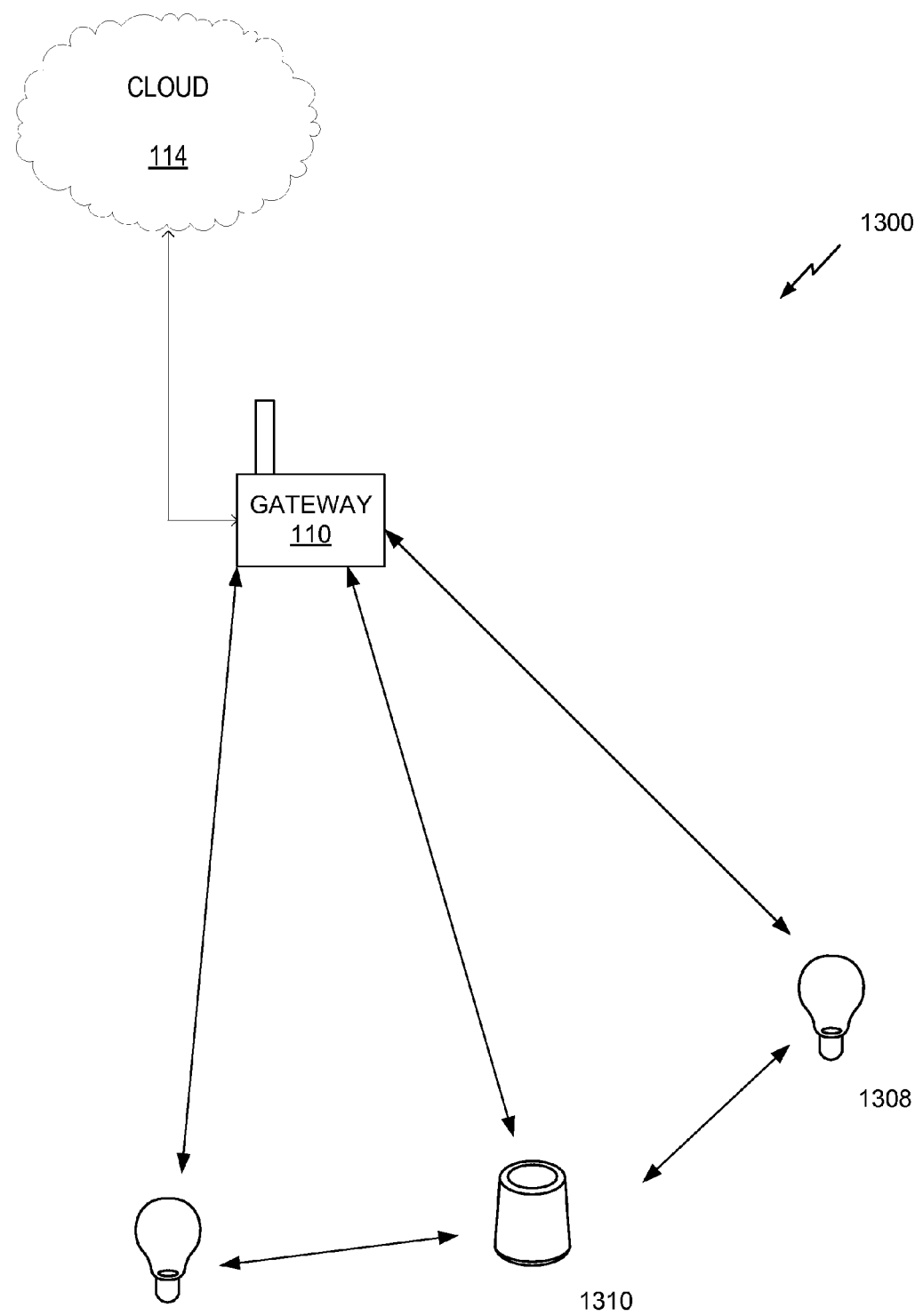
FIG. 13 illustrates an example of a local area network including a gateway and three devices connected to the gateway, according to embodiments of the present invention.

FIG. 13 illustrates local area network 1300, according to embodiments of the present invention. Local area network 1300 includes two light bulbs 1308 and 1312 and a motion sensor 1310. Light bulbs 1308 and 1312 and motion sensor 1310 may be connected to network 1300 via network devices. In other words, network devices, such as network devices 608, 612 and 610 (as shown in FIG. 9, for example) may be connected to network 1300 (and therefore to gateway 110), and light bulbs 1308 and 1312 and motion sensor 1310 may be connected to network devices 608, 612 and 610, respectively.

Although light bulbs 1308 and 1312 are a different type of device as motion sensor 1310, light bulbs 1308 and 1312 and motion sensor 1310, or the network devices that connect light bulbs 1308 and 1312 and motion sensor 1310 to network 1300, may still be included in the same device group. Disparate devices, such as a light bulb (e.g. bulb 1308 and 1312) and a motion sensor (e.g. sensor 1310) may be included in the same device group if the devices are capable of the same functionality between the disparate devices. For example, light 1308 and sensor 1310 may each include the functionality of turning on and off. Furthermore, it may be beneficial to the user to turn on or off light 1308 and sensor 1310, such as if sensor 1310 is a motion sensor that turns on light 1308 when it detects motion, at the same time. Therefore, such devices may be included in the same group so as to allow a user to control the devices based on their common functions.

Although disparate devices may include the same or similar functionality, it may still not be beneficial for a user to group such devices together. For example, although a light and a coffee maker may each be capable of turning on and of a user may not want to turn off a coffee pot if it is in use and in the process of making coffee at the same time it wants to turn off a light in the same room. Therefore, a user may choose to restrict certain devices from being grouped together. Such a restriction may be predetermined before such devices are connected to the network, or a rule to restrict such a grouping may be created by the user after the devices have been connected to the network.

Although disparate devices may be grouped in the same group, as described with respect to FIG. 13, devices may be capable of a different set of functionality that other devices in their respective groups are not capable of. A device or the network may become confused when the device receives a command or request to perform a certain function. A device may fail to perform a certain function because the device is capable of alternative functions for which it did not receive a command. For example, device 1308 may be a light switch that turns on and off but may also include the functionality of a dimmer, while device 1312 may be a light switch that turns on and off but does not include any other functionality. The network and/or one or more of devices 1308 and 1312 may become confused and/or fail to perform one or more functions because they do not include the same set of functions because the network and/or devices may not understand commands received from the access device and/or network (e.g. network 1300 or cloud network) directed to only one function of the device.

Several techniques are possible to avoid such a problem. First, the device, network, or group may deactivate the functions of the devices that are not common to all devices in the group. In other words, the group may detect (and therefore be able to be controlled regarding) a set of functions that are the least common denominator functions of the devices in the group and deactivate the other device functions of the devices in the group. In an alternative embodiment, the device, network, or group may automatically pull the device that includes additional functions out of the group. For example, if a user selects a device to be placed into a new or already existing group, or if the access device and/or network automatically selects the device to be placed into a new or already existing group, the network and/or device may detect that the device includes additional functionality that the other devices in the group do not have and remove the device from the group. The device and/or network may also decide to not include a device in a group (e.g. during an automatic grouping process) because of its functionality that may be disparate from the other devices in the group.

In another alternative embodiment, an alternative functionality may replace one or more of the common functionalities that make up the group. For example, new device 1 in FIG. 11 includes the functionality of a light dimmer. Therefore, the light includes various levels of light including on, of and various levels of light in between as decided by the dimmer or a user changing the dimmer setting. Therefore, a certain dimmer setting may replace the "on" or "off" setting that the group views as common to each of the devices in the group. For example, the device may, within the confines of the group, turn "off" and to "dimmed". The "dimmed" function may be at whatever selected dimmed state is chosen by the user (e.g. 70% dimmed). In other words, when a command is given to each of the devices in the group to turn on, most devices in the group turn fully on and the device that includes a dimmer turns to the dimmed state chosen by the user. In order to change the dimmed state from a first dimmed state to a second dimmed state, the access device may be able to give the user temporary access to the dimmer setting so as to allow the user to change the dimmer setting. The dimmer may also be changed in certain embodiments from the physical dimmer switch at the light.

In another alternative embodiment, the devices in the group that include functions that other devices in the group are not capable of may not respond to requests or commands to perform that function. For example, if the user, access device or network sends a request to new devices 1, 2 and 3 to dim their lights, devices 2 and 3 may not respond to the request because they do not have dimming capability. On the other hand, device 1 may respond to the request because it does have dimming capability.

A group may be created in different ways. For example, a user of an access device controlling network devices on the network may create a group and/or edit a group using the access device. Such examples are further discussed with respect to FIGS. 19-20. Alternatively, device groups may be created using automatic grouping. Devices may be grouped automatically, without user intervention, by an access device (such as access device 108), a network device or another device on the local area network (such as a gateway e.g. gateway 110), a cloud network (such as cloud network 114), or a device external to the network (although when referred to herein such a device capable of automatic grouping may be referred to as an access device, it should be understood that any of the devices described herein may perform automatic grouping methods). Automatic grouping includes the process of grouping devices within a network into groups based on the common functions or capabilities that each device is able to perform and other factors that make the control of multiple devices together, as a single virtual device, convenient.

A device, such as an access device, may determine, without intervention/input from a human user, which devices are able to be or should be grouped together in the same device group, by compiling a set of functions that each device is capable of performing. The device may store the compiled functions in a list. In order to determine which functions a device is capable of, the access device may communicate with the network device. For example, the access device may transmit a communication to the device requesting an indication (e.g. a list) of the functions that the network device is capable of performing. The device may respond to the query with a communication including an indication of the functions that it is capable of performing. Information about what functions a device is capable of performing may also be communicated to the access device, or whichever device is performing automatic grouping, while the device is in the process of joining and/or being authenticated to join the network. For example, as noted with respect to FIG. 6, when a network device is powered on, a setup access point (e.g. wireless access point), such as setup access points 609, 611 and 613, is generated by the device to allow devices on the network to connect to the new device using WiFi or other standards. Furthermore, identification information and other information may be sent by the new network device to a device on the network, such as a gateway, via the network device's setup access point. Included in such information sent to the network during setup may be information related to the functions that the device is capable of performing. However, such information may be communicated to other devices on the network, an access device connected to the device, a cloud network, etc. at any other time during or after the device joining the local area network.

A device, such as an access device, may obtain information related to the functions that a device may be able to perform in alternative ways. For example, a network device may be able to compile such functions related to another (e.g. new) device due to its personal interaction with the device. For example, a motion sensor that is connected to a light may know that the light is capable of turning on and off and may also know that the light includes a dimmer such that a user may dim the light to a lighting amount less than 100% of its capability. The access device, or other device performing automatic grouping including the light, may receive information regarding the light's capabilities from the motion sensor. Furthermore, as noted with respect to FIG. 4, devices on the network may share information with each other regarding the status and/or performance of other devices on the network. Capability information regarding a device may be shared among devices on the network, and therefore an access device may obtain such capability information regarding a network device from any device on the network, from a cloud network connected to the network, or from any other device that had previously obtained such information.

Furthermore, device groups may be determined by the geographic location of each device being considered. For example, multiple devices may be placed in a group, and therefore controlled together at the same time, because they are all located in the same area of a structure or in the same room of a building.

Figure 14:
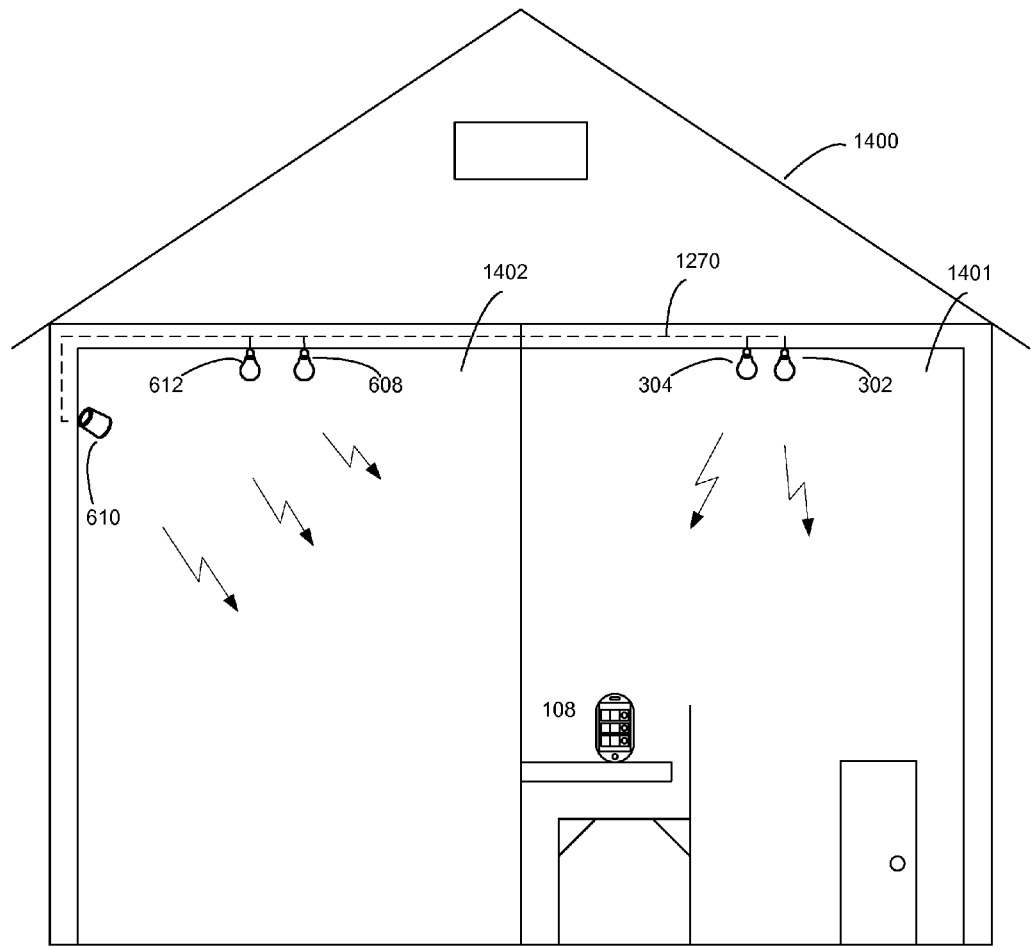
FIG. 14 illustrates a house with two rooms and network devices in each room, according to embodiments of the present invention.

FIG. 14 shows a house with two rooms and network devices in each room that may be grouped, according to embodiments of the present invention. FIG. 14 includes house 1400. House 1400 includes two rooms, room 1401 and room 1402. Room 1401 includes network devices 302 and 304 and access device 108. Network devices 302 and 304 are represented by lights in FIG. 14. However, network devices 302 and 304 may not be the lights themselves, but rather may be network devices that have lights or light bulbs connected to the network devices. Room 1402 includes network devices 608, 610 and 612. Network devices 608 and 612 are represented by lights in FIG. 14. However, network devices 608 and 612 may not be the lights themselves, but rather may be network devices that have lights or light bulbs connected to the network devices. Network device 610 is represented by a motion sensor. However, network device 610 may not be the sensor itself, but rather may be a network device that has a motion sensor connected to the network device. It may be beneficial to group network devices 302 and 304 in room 1401 in the same grouping because they are in close proximity to each other (e.g. in the same room). Therefore, a user may choose to turn the lights connected to network devices 302 and 304 on or off at the same time. Similarly, it may be beneficial to group network devices 608, 610 and 612 in the same grouping because they are in close proximity to each other (e.g. in the same room). Therefore, a user may choose to turn the two lights and sensor connected to network devices 608, 612 and 610, respectively, on or off at the same time.

Access device 108 may automatically detect that the devices in room 1401 may or should be grouped together, and may automatically detect that the devices in room 1402 may or should be grouped together. For example, access device 108 may initiate a process by which access device 108 may determine that the devices in a particular room are in the same room. More specifically, access device 108 may transmit a communication (e.g. a query) to all of the network devices in house 1400, including network devices 302, 304, 608, 610 and 612. The transmitted communication may include a request for the network devices to each transmit back a response to the communication/query indicating that the network devices received the communication from access device 108. The access device 108 may determine how devices can/should be grouped based on their responses to the query. For example, access device 108 may determine how devices can/should be grouped based on how long it took to receive a response from each network device. For example, if network devices are geographically close to each other, the access device should receive responses from those network devices in approximately the same amount of time. For example, access device 108 should receive a response from network devices 608, 610 and 612 at approximately the same time because each of the three network devices are a similar distance away from access device 108.

In an alternative embodiment for automatic grouping, access device 108 may determine which devices should be grouped together related to their geographic location based on which circuits the network devices are connected to (or which portion of a circuit the network devices are connected to). More specifically, for example, access device 108 may determine that network devices 302 and 304 are connected to the same circuit. For example, each of the network devices maybe connected to each other via a wire, such as wire 1470. As shown in FIG. 14, network devices 302, 304, 608, 610 and 612 are all connected to wire 1470. Therefore, if access device 108 or another device initiates a signal (e.g. a query) to be sent through wire 1470 including a response request, access device 108 could again determine the approximate relative location of each network device based on their response time.

The access device may initiate such a process on a periodic basis. Such a periodic repeating of this process may allow the access device to periodically assess the grouping profile of the system, and may allow the access device to (automatically or otherwise) adjust the grouping profile (e.g. switch a device from to a different group, remove a device from a group, add a new device to a group, etc.) based on changes in the network's topology and communication abilities.

Other methods are possible for detecting which devices should be grouped together. For example, an access device may detect which devices should be grouped together based on which devices are turned on/off at the same time. Since a switch may control the on/off function of multiple network devices, the network devices may be turned on/off at the same time regularly. Therefore, the access device may detect such a pattern, and analyze such behaviors of the network devices to determine that the network devices should be grouped together in the same group. More specifically, an access device may receive signals/communications from each network device when it performs a function. For example, the access device may receive a notification any time the switch is flipped/switched and/or any time any of the network devices are activated or turned on/off (e.g. light turns on/off). The access device may compile those performed functions for each device over time and store a list or database of those functions and information related to each function (time, between which devices, etc.).

An access device may also sense/analyze other similar behaviors of other network devices without the use of a switch that controls both network devices and therefore causes the network devices to turn on/off at the same time on a regular basis. For example, the access device may detect that a sensor is activated at the same time that lights are turned on. Since such network devices are activated or turned on at the same time, the access device may determine that those three network devices are associated with each other, and therefore should be grouped together. For example, an access device may know that a network device is or is connected to such a sensor and may detect motion directly that causes the network devices to turn the lights on. Analysis of such observations may also cause the access device to determine that network devices should be grouped together in the same group.

In another example, a device may determine that a certain group of network devices should be grouped together based on the date they were purchased. A device may determine that a certain group of network devices should be grouped together based on the date they were connected to the network. Such a decision may also be based on the serial number associated with each device. For example, the serial numbers may be assigned to devices in chronological order. Network devices may communicate their serial numbers to the network upon entering the network, or the access device may detect the serial number on the device.

There are alternative ways for a user to group devices using the devices themselves. For example, the user may direct the access device to transmit a communication to certain network devices (e.g. the network devices in a room) including a request for the network devices to take an action. For example, the communication may request that multiple light bulbs turn on and then turn off within a short amount of time (i.e. a flicker with a predetermined or non-predetermined pattern). A network device may utilize an LED on the device if the device does not have a bulb. The access device may be able to detect such actions taken by the network devices, and may subsequently group the network devices (that took action) in the same group. Furthermore, a user may use near field communication to, within a predetermined amount of time, initiate a communication between the access device and each network device that the user would like to be grouped together. The access device may subsequently group the chosen network devices in the same group. Alternatively, a camera or video camera (of the access device or otherwise) may be used to detect network devices in a certain geographic area. For example, an access device may take a picture of a room and detect which network devices are present in the room (either because of a marking or an action taken by the devices) and group the set of devices or a subset of the devices in the same group. In another example, a video camera on the access device may video tape multiple light bulbs in the same room initiating a blinking pattern, causing the access device to recognize the network devices. The blinking pattern may represent serial number associated with the respective devices, or the devices may broadcast their serial numbers using a different method. The access device may subsequently place the detected network devices in a device grouping.

Generally, access device 108 may, by controlling the network devices on the network and observing their functions and actions over time and in relationship to each other, determine which devices can/should be grouped together in the same device groups. It may also be beneficial to use a combination of the methods described herein to determine which devices may or should be combined into a group, as one method may not yield the most ideal grouping results by itself.

Furthermore, access device 108 may automatically correct a previously grouped set of network devices. For example, a grouping profile, made up of one or more groups, may be automatically adjusted if a new network devices enters the network, if an existing network device leaves the network, if a network device is replaced with a network device that is capable of different functions, if a network device loses one or more of its functions (e.g. a function that is common among the network devices in its group), among other reasons. A user of access device 108 may select a setting within the access device to indicate to the access device whether the user wants the access device to automatically update based on such changes in the network. Alternatively, the access device may present a query or notification to the user each time the network changes (e.g. new network device present, network device left the network, etc.) so that the user may choose whether to allow the access device to update or whether the user would like to control changes to the grouping profile based on the change in network topology. For example, as noted, a set of devices (e.g. multiple light bulbs) may be grouped together (including their respective network devices) based on an observation by the access device that the light bulbs turn on and off at the same time. However, if one of the light bulbs stops turning on/off along with the rest of its group, the access device may assume that the device was removed, that the switch that controls the device was adjusted to not control that light, or that a renovation took place. Based on that observation, the access device may automatically elect to remove that device from the group. Alternatively, the access device may send a query or notification to the user via its display indicating that such a change took place with respect to that light, and ask the user how the user would like the system to respond.

If a network device is removed from a group, the group may be controlled by additional functionality for which the group may not previously have been able to be controlled. For example, if a group is being controlled using a set of functions determined to be the least common denominator of the devices in the group (and deactivated the other device functions of the devices in the group for purposes of control), and the removed device prevented certain functions from being a part of the least common denominator set of functions, the set of functions for control of the remaining devices may adjust to add those functions. More specifically, if three devices, including two light bulbs with dimmers and one motion sensor were in a group, the least common denominator set of functions may include only the devices' on/off capability (and the dimming capability/functions of the lights and any other functions of the sensor may be disabled). However, if the motion sensor is removed from the group, the least common denominator set of functions across the remaining devices, two light bulbs, may include the dimming capability of the lights. Therefore, the access device or other device controlling the group profiles may automatically/dynamically add the dimming function to the functions able to be controlled by the access device. In an alternative embodiment, the access device may transmit a prompt/query to the display/user asking the user whether the user would like to control the new common functionality (i.e. dimming of the two light devices).

Devices may also be pre-grouped before being purchased by a user. For example, certain devices may be purchased with a predetermined grouping profile such that the user may not need to generate new groupings or perform automatic grouping related to those devices. For example, a set of light bulbs may be divided into two or more groups (and, for example, either sold as a set or give the purchaser/user the ability to buy as many of each group as they choose) so that the purchase may place the grouped light bulbs in, for example, separate rooms. Therefore, when the user attempts to control the devices using an access device, the devices may already be grouped according to the purchasing choices of the user. The devices may be pre-grouped by, for example, registering such groups in the firmware of each device. The access device may allow the user to edit the predetermined groups at a later time by adding, subtracting, or shifting network devices to/from the device groupings.

Figure 15:
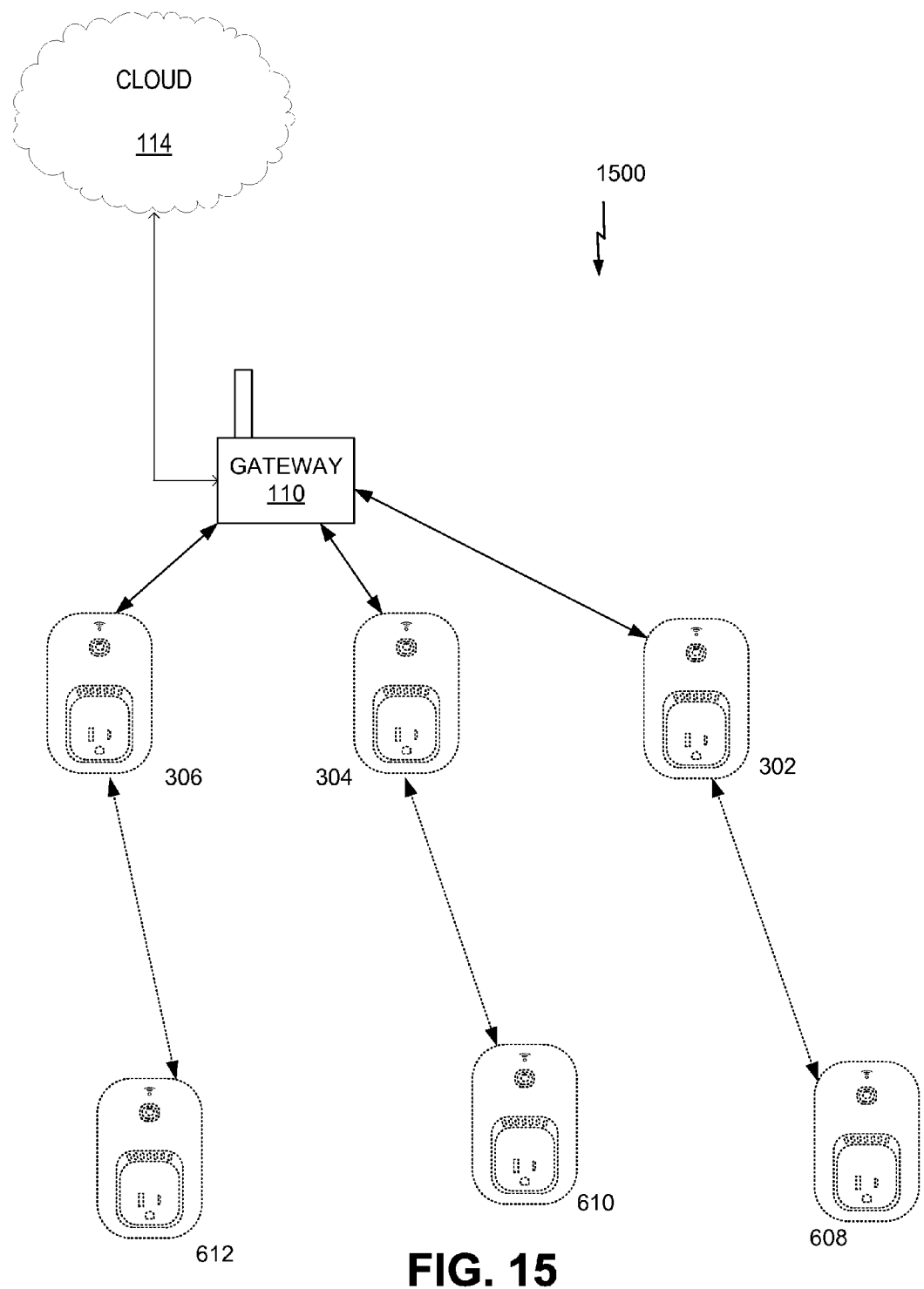
FIG. 15 illustrates an example of a local area network including a gateway and three network devices each connected to a new network device, according to embodiments of the present invention.

FIG. 15 illustrates an example of a local area network 1500 including a gateway and three network devices connected to three new network devices, according to embodiments of the present invention. As noted with respect to FIG. 9, new network devices 608, 610 and 612 may transmit identification information (and possibly other information) to an existing network device, such as network device 304. Network device 304 may then aggregate the identification information received from new network devices 608, 610 and 612, and may then send the identification information, either aggregated or individually, to access device 108. However, the identification information corresponding to or associated with the new network devices 608, 610 and 612 may be each transmitted to a different existing network device, such as network devices 302, 304 and 306. More specifically, after new network devices are powered or turned on and generate their individual setup access points, one of the existing network devices, such as network device 304, may detect that each of the new network device 608, 610 and 612 are associated with network 1500. Network device 304 may then transmit a communication to the other existing network devices, such as network devices 302 and 306, regarding new network device 608, 610 and 612. More specifically, network device 304 may then transmit a communication to network devices 302 and 306 requesting that network devices 302 and 306 each connect to a new network device (e.g. via the setup access point for a new network device). Since each network device may only connect (i.e. be connected to a WiFi channel shared by the new network device, or that the setup access point of the new network device is transmitting across) to one new network device at a time, three different network devices connecting to three different new network devices at the same time allows for the new network devices to connect to the network and transmit their identification information in parallel, saving time and efficiency. Therefore, as shown in FIG. 15, existing network device 302 may connect to new network device 608, existing network device 304 may connect to new network device 610, and existing network device 306 may connect to new network device 612.

In an alternative embodiment, a single network device may not be the first existing network device to detect a signal or request from a new network device to join the network. Instead, each existing network device may be in closest proximity to one of the new network devices and may therefore detect the new network device in its area. As such, each new network device may connect (e.g. via its setup access point) to an existing network device on its own.

Figure 16:
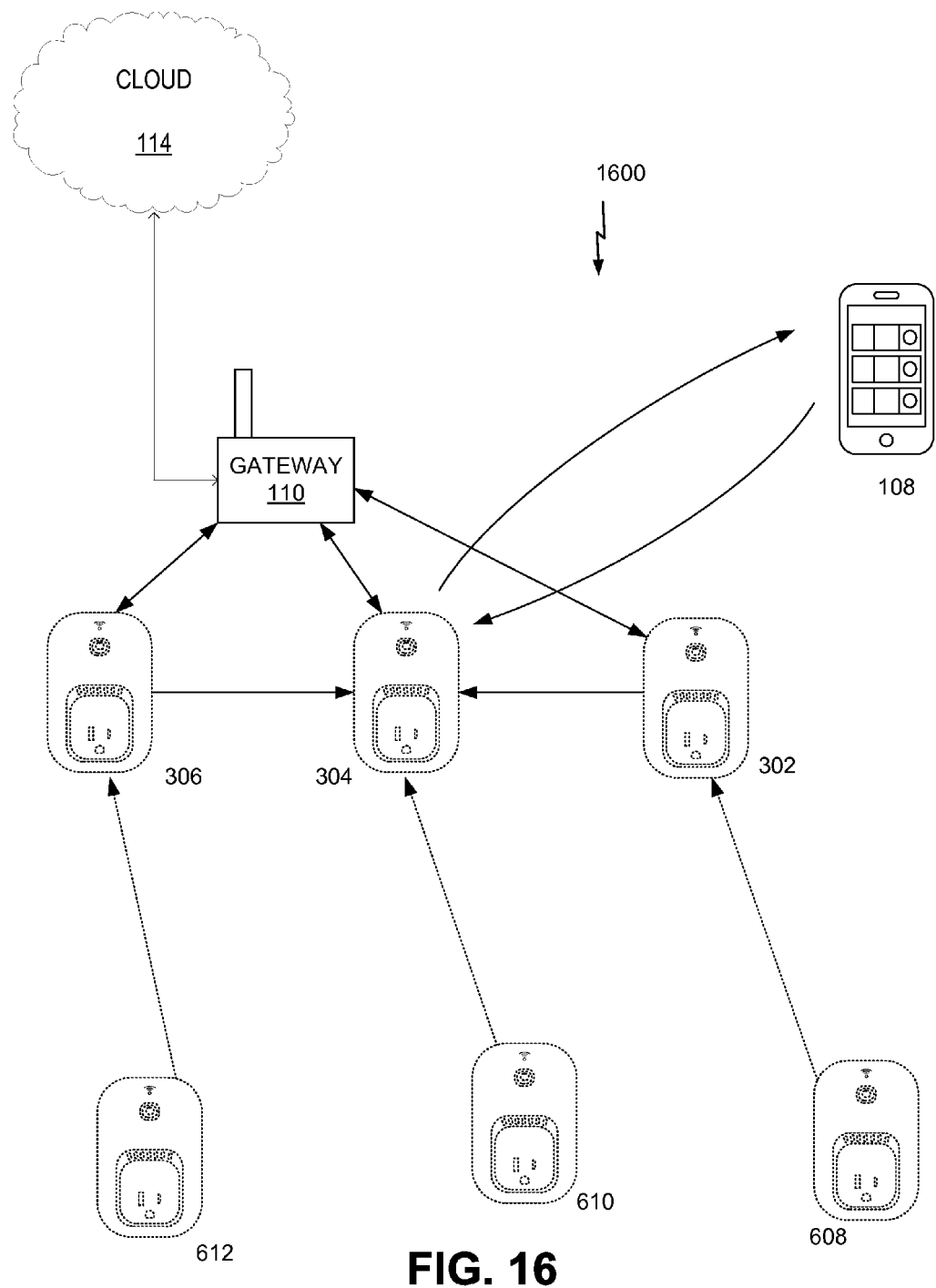
FIG. 16 illustrates an example of a local area network including a gateway and three network devices each connected to a new network device and one network device connected to an access device, according to embodiments of the present invention.

FIG. 16 illustrates an example of a local area network 1600 including a gateway and three network devices connected to three new network devices, according to embodiments of the present invention. As noted, existing network device 302 may connect to new network device 608, existing network device 304 may connect to new network device 610, and existing network device 306 may connect to new network device 612. As such, new network device 608 may transmit its identification information to existing network device 302, new network device 610 may transmit its identification information to existing network device 304, and new network device 612 may transmit its identification information to existing network device 306. Thereafter, network devices 302 and 306 may transmit the identification information it received from its corresponding new network device to network device 304 so that network device 304 may transmit the identification information for all three new network devices to access device 108, as described with respect to FIG. 9. Alternatively, each existing network device may transmit its received new network device identification information to access device 108 on its own. After access device 108 receives identification information associated with each of new network devices 608, 610 and 612, access device 108 may use the identification information to authenticate the new network devices. More specifically, access device 108 may use the identification information to generate one or more authentication queries (or an authentication in another form) to authenticate one or more of new network devices 608, 610 and 612. More specifically, access device 108 may display the identification information to the display/interface of access device 108 such that the identification information will be presented to a user of the access device. The identification information of new network devices 608, 610 and 612 may be presented as received by network device 304 from new network devices 608, 610 and 612 or may be manipulated to be presented in a user-friendly manner. For example, the identification information may be presented in a list of new network devices so as to allow the user to select the network devices that the user wishes to authenticate to join the network.

After the identification information of new network devices 608, 610 and 612 is displayed at a user interface of access device 108, access device 108 may receive inputs from a user of the access device indicating one or more answers to the query or queries related to authentication of new network devices 608, 610 and 612. For example, a user may select certain devices of new network devices 608, 610 and 612 to authenticate, may select all of new network devices 608, 610 and 612 to authenticate, or may select none of new network devices 608, 610 and 612 to authenticate. Upon selecting one or more new network devices 608, 610 and 612 to authenticate, access device 108 may transmit one or more communications or responses to the queries/requests from network device 304 indicating which of new network devices 608, 610 and 612 have been authenticated to join the network. The user may select the network devices to authenticate and also select a "send" or "submit" button on access device 108, or access device 108 may send responses to network device 304 immediately upon receiving inputs from the user.

Figure 17:
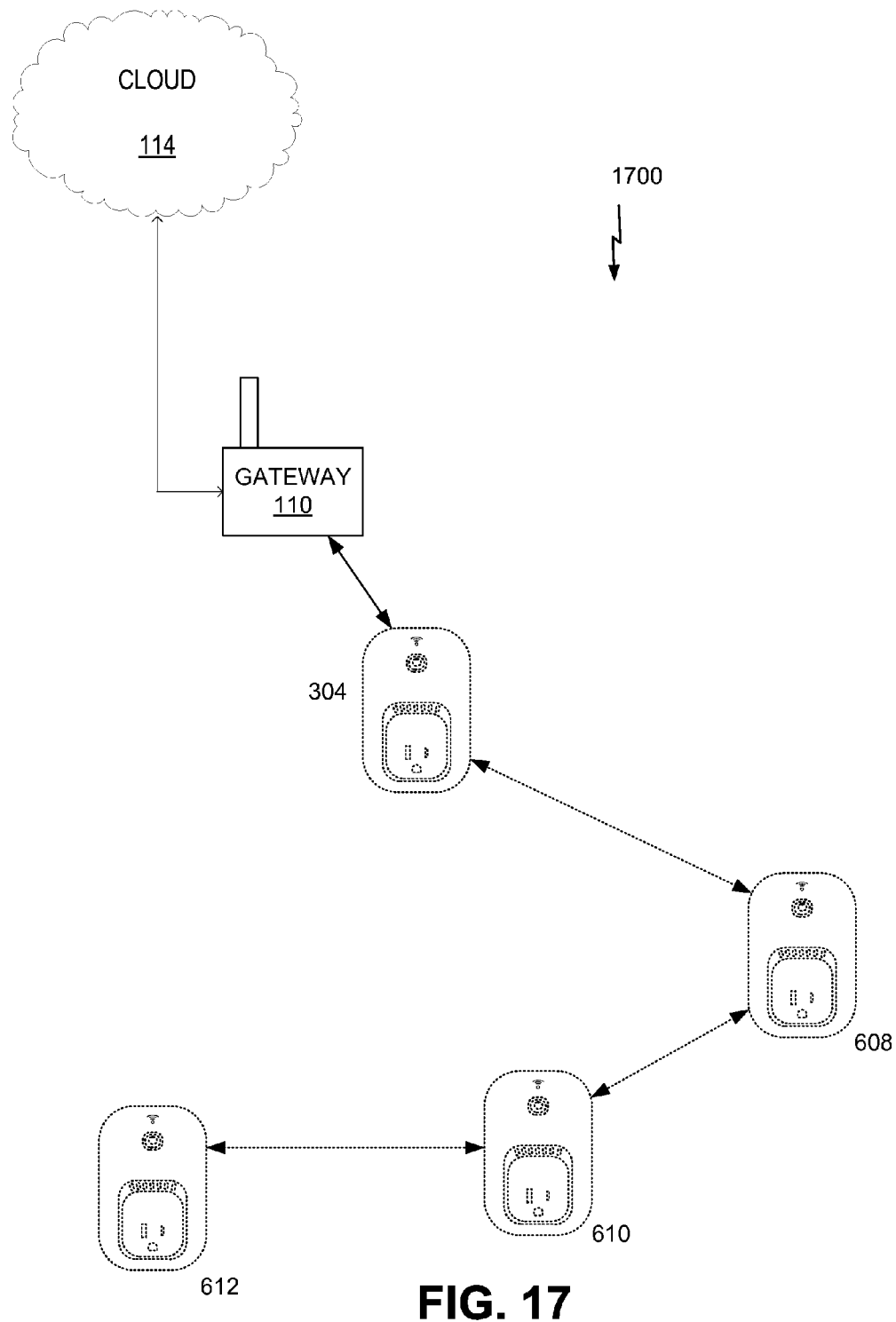
FIG. 17 illustrates an example of a local area network including a gateway and a network device each connected to three new network devices in a chain, according to embodiments of the present invention.
Figure 18:
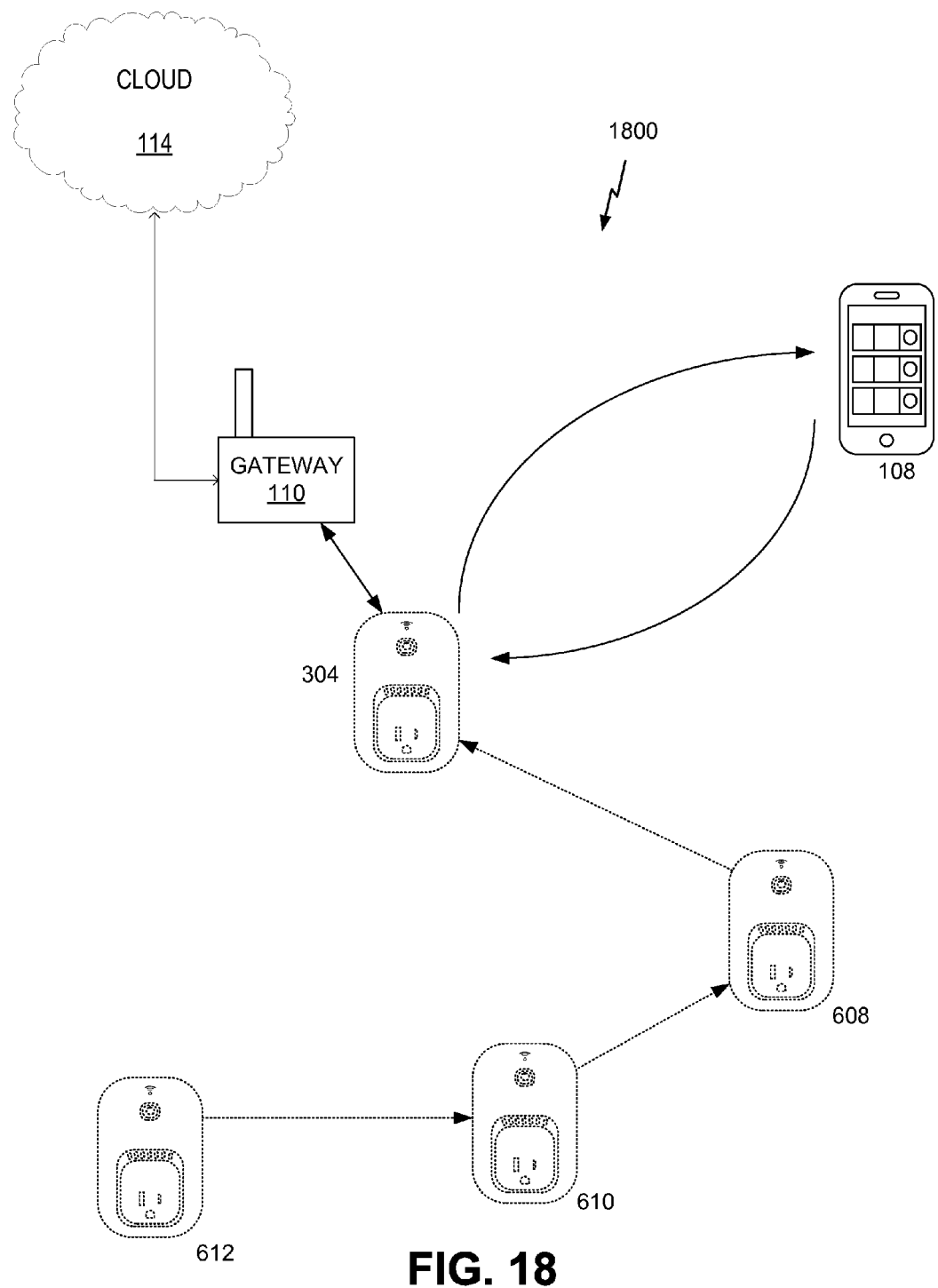
FIG. 18 illustrates an example of a local area network including a gateway and a network device each connected to an access device and three new network devices in a chain, according to embodiments of the present invention.

FIGS. 17 and 18 illustrate an example of a local area network including a gateway and a network device connected to three new network devices, according to embodiments of the present invention. As noted with respect to FIG. 9, new network devices 608, 610 and 612 may transmit identification information (and possibly other information) to an existing network device, such as network device 304. Network device 304 may then aggregate the identification information received from new network devices 608, 610 and 612, and may then send the identification information, either aggregated or individually, to access device 108.

However, the identification information corresponding to or associated with the new network devices 608, 610 and 612 may be each transmitted between new network devices in a chain. As shown in FIG. 17, new network devices may connect to each other, one after another. For example, after existing network device 304 detects that new network devices 608, 610 and 612 are present and/or are associated with network 1700, network device 304 may transmit location or other information regarding the presence of new network devices 610 and 612 to new network device 608 and request identification information from new network devices 610 and 612. Thereafter, network device 608 may transmit its identification information back to network device 304, as shown in FIG. 18, and may also transmit identification or other information regarding the presence of new network device 612 to new network device 610 along with a request for their identification information. Thereafter, new network device 610 may transmit its identification information back to network device 608 (which may then transmit that information back to network device 304, as shown in FIG. 18), and may also transmit a request for identification information from new network device 612. Thereafter, new network device 612 may transmit its identification information back to new network device 610 (which may then transmit that information back to network device 304 via new network device 608, as shown in FIG. 18). Such a chain may cause network device 304 to obtain identification information from each new network device while only connecting to one of the new network devices (or, alternatively, to the setup access point of that new network device).

Although this embodiment of the present invention is described with respect to a single chain of new network devices, different numbers of chains may be possible. For example, two different chains of new network devices, for transferring identification information back to a network device on the network, may connect to (i.e. start from) existing network device 304 or to new network device 608. Such chains may be based on geographic proximity, network proximity, or other factors.

In such an embodiment, because the identification information for different network devices may travel between different numbers of network devices, the identification information of different new network devices may take a different amount of time to reach existing network device 304. Such a delay may be already known by existing network device 304 (or any other device that detects the new network devices) because it requested the chain of communications to be created in the first place. However, other devices in the chain may not know how many devices are in the chain(s) or their locations and how such factors may affect the time it may take for transmissions (e.g. of identification information) to travel back through the chain to the network. However, network device 304 (or any other device that detects the new network devices) may transmit, along with the request(s) it sends to the first new network device in a respective chain, an indication of the location and/or other information related to each of the new network devices. Alternatively, network device 304 may transmit a request for each new network device to wait a specific amount of time to receive identification information or for new network devices to otherwise communicate with it before discontinuing communication within the chain.

Figure 19:
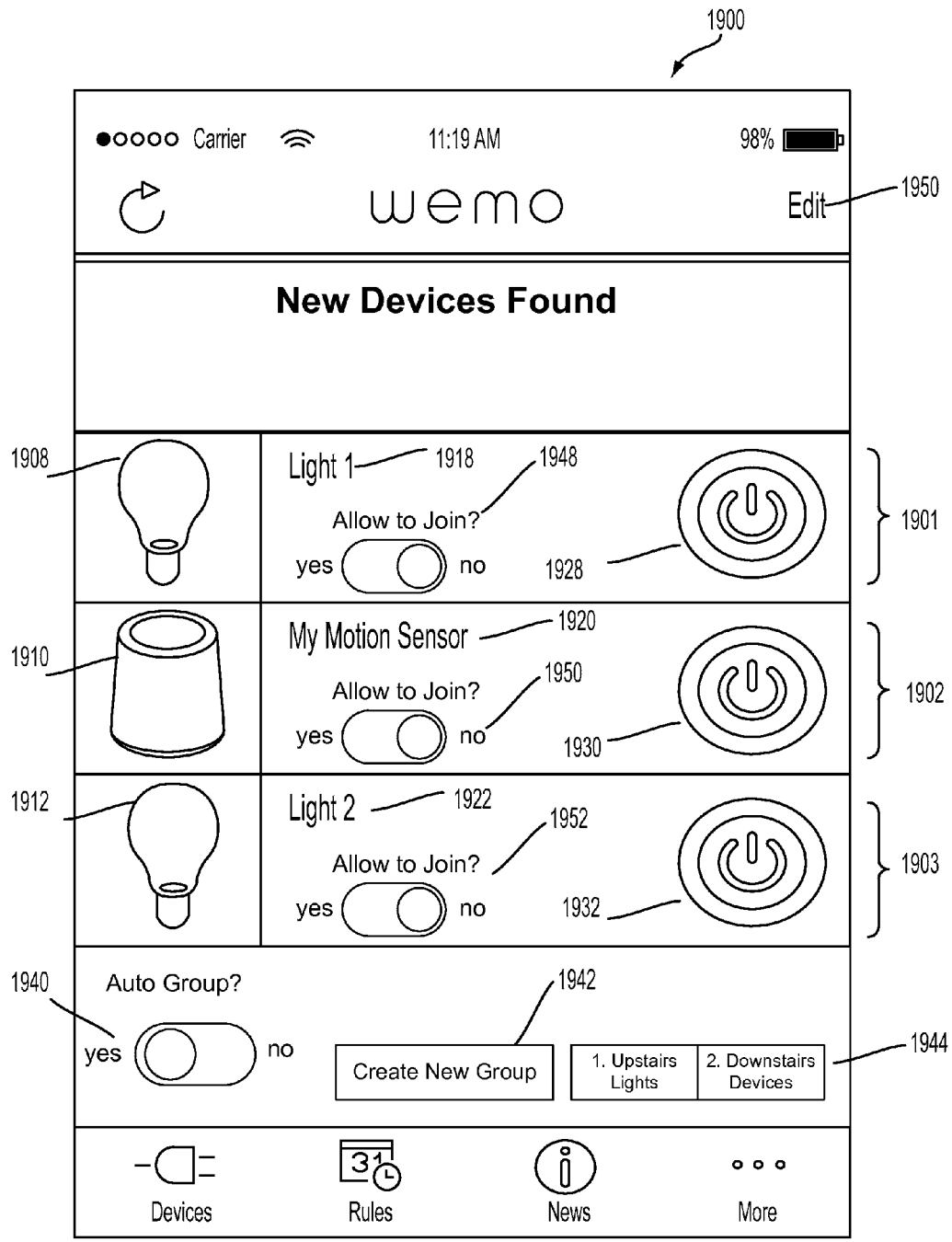
FIG. 19 illustrates an exemplary user interface display for an application on an access device, according to embodiments of the present invention.
Figure 20:
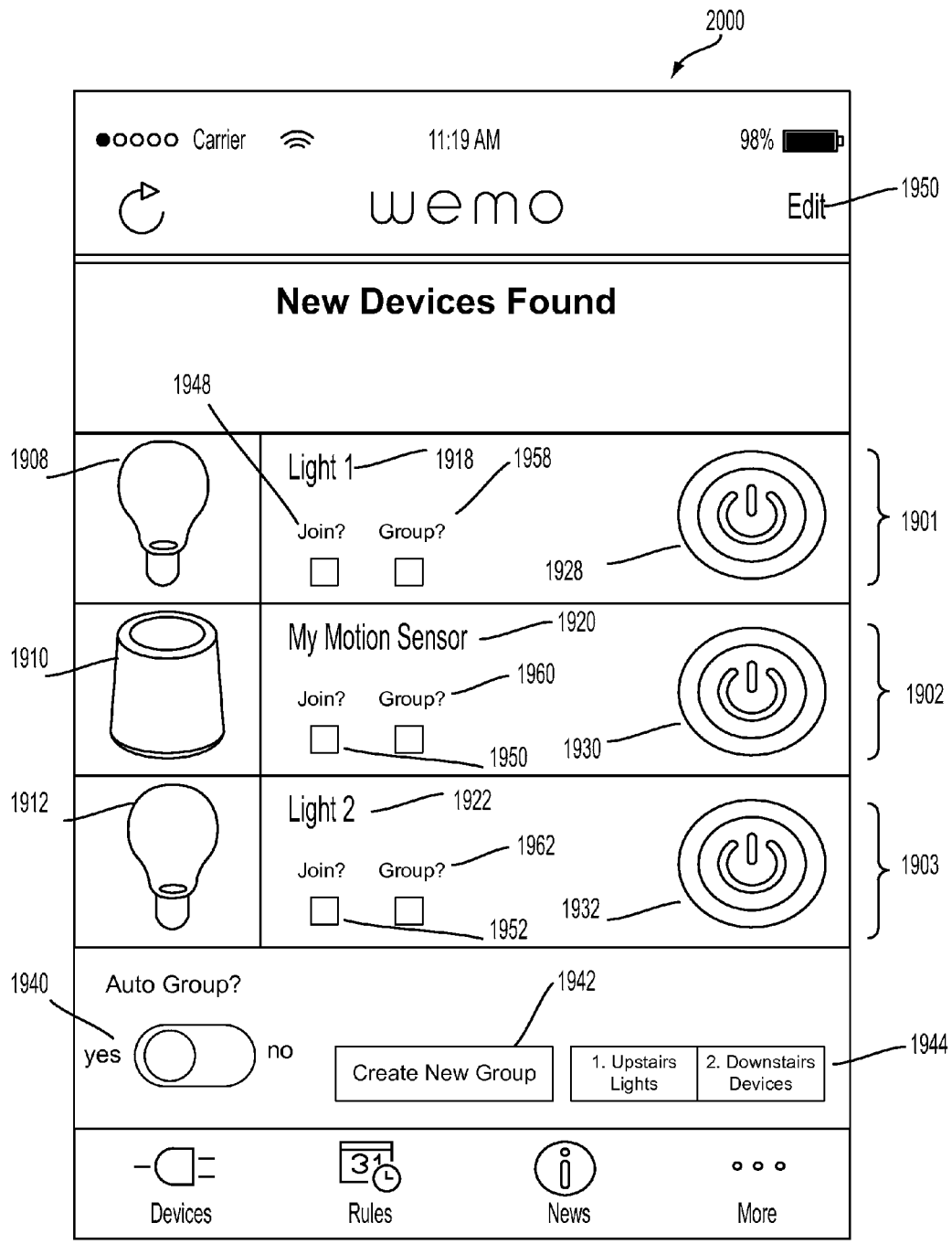
FIG. 20 illustrates an exemplary user interface display for an application on an access device, according to embodiments of the present invention.

FIGS. 19-20 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 19-20 are displayed on a mobile computing device, which can have a touch sensitive (i.e., touch screen) display device. For ease of explanation, the monitoring and control operations discussed below with reference to FIGS. 19-20 are described in the context of an application executing on an access device 108 with a touch-screen display device. However, the operations are not intended to be limited to the exemplary device shown in FIGS. 19-20. It is to be understood that the user interfaces illustrated in the exemplary embodiments of FIGS. 19-20 can be readily adapted to be rendered on displays of a variety of computing device platforms running a variety of operating systems. Throughout FIGS. 19-20, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

FIG. 19 illustrates an exemplary user interface display 1900 for an application on an access device, according to embodiments of the present invention. FIG. 19 discloses a list of three exemplary network devices, including network devices 1908, 1910 and 1912, which have displays 1901, 1902 and 1903, respectively, are assigned to devices 1918, 1920 and 1922, respectively. Network device 1908 is connected to a light 1918, network device 1910 is connected to a motion sensor 1920, and device 1912 is connected to a second light 1922. Network device 1908 (or the light 1918) can be turned on by a user by pressing button 1928, network device 1910 (or the light 1920) can be turned on by a user by pressing button 1930, and network device 1912 (or the light 1922) can be turned on by a user by pressing button 1932.

When one or more new devices join the network, an access device may detect that those new devices are present on the network. For example, the access device, if connected to the local area network, may send a query or multiple queries over time to the gateway, which is connected and/or communicates with each network device on the network, requesting a response or a notification of any new network devices that are present on the network. If the access device is remote from the local area network, the access device may send a query or multiple queries over time to a cloud network, which is connected and/or communicates with the gateway and/or each network device on the network, requesting a response or a notification of any new network devices. The access device may then display the network device(s) on a display or user interface of the access device, such as display 1900.

The display of network devices, such as devices 1908, 1910 and 1912 may include a request/query to authenticate each of the newly discovered network devices. For example, display 1901 for device 1908 includes a query 1948 that asks whether the device should be allowed to join the network. Similarly, display 1902 for device 1910 includes a query 1950 that asks whether the device should be allowed to join the network and display 1903 for device 1912 includes a query 1952 that asks whether the device should be allowed to join the network. The user may then press or slide the button under each display's "Allow to Join" query to indicate whether each device is authenticated to join the network. The user may authenticate all, some, or none of the network devices to join the network. After the user selects an answer to one of the queries associated with one or more of the network devices, the access device receives the inputted answer and transmits a communication/notification of the input from the user. The access device may transmit such a response/input to a gateway on the network or to an existing network device on the network. The gateway or network device may then use the query answers to decide whether or not to authenticate the new network device(s), send the new network device(s) network information such as the network's credentials, allow the new network device(s) to join the network, etc. Alternatively, the access device may use the query answers to make such a decision, and then transmit a communication to the gateway or existing network device indicating the decision (e.g. if the user answered "yes" to a query, a communication including a command to send the network credentials to the new network devices).

As shown in FIG. 19, the user may also group the new network devices into either new groups (e.g. by pressing button 1942) or existing groups (by pressing grouping buttons 1944). The user may group the new network devices into a new group, for example, if the functions that the new network device(s) are capable of do not match or fit with a currently existing group. More specifically, after the user presses button 1942, the access device may create a new virtual group and store information about the virtual group (and any other groups) internally. Alternatively, the access device may send a communication to a cloud network or other external storage regarding the creation of a new group, and may subsequently store information related to any network devices that are placed in the new group. For example, the access device and/or cloud network may create and store a table/list/chart that includes each group and each of the network devices included in that group. The table may include the functions of each network device that is associated with each group, since the reason that certain devices are grouped together may be because of the functions that each device can perform.

Various user interface techniques may be available for a user to add a new device to an already existing group. For example, a user may press on the tile representing a network device display and drag and drop that tile on top of a tile that represents an existing group. For example, a user may press on device display 1901 and drag that display until it is placed over the "1. Upstairs Lights" tile, which represents an already existing group of lights in the upstairs of a house. Alternatively, a user may select an existing group (by, for example, pressing on an existing group tile, such as an existing group tile), and then subsequently touch the tiles associated with the network devices that the user would like to add to the group. Alternatively, the user may press on the "edit" button 1950 to edit the existing groups. For example, after pressing edit 1950, check boxes may appear next to each new device so that the user may select the devices that the user would like to place in an existing group. Thereafter, the checked devices may collapse into a group together. Various other variations of these types of user interface setups are also possible. Each time a user presses on a button within display 1500, a communication may be sent from the access device to the stored group information, whether internally or on an external storage device (e.g. cloud network, such as cloud network 114). For example, the access device may transmit a communication to the cloud network to indicate that a new device has been added to an already existing group. The communication may include a command or request to move the device information associated with the moved device to a different portion of the table or chart that includes the device grouping information. Similar transmission of communication between the access device and the storage device may occur each time a user presses/touches the display to enter a command for the access device to perform.

As noted, the user may manually group the new network devices into such groups or may choose to have the new network devices automatically grouped. To automatically group, for example, the user may select an answer "yes" to the "Auto Group?" query 1940, causing the access device (or cloud or other device connected to the access device) to automatically group the new network devices or suggest a grouping profile for the new network devices, which the user may then accept, reject or edit (e.g. by pressing edit button 1950).

In each exemplary embodiment in which a user adds a device to an already existing group, or in other words edits the group profile of the system, the access device may transmit a communication to the local or external storage that houses/stores the group profile information, including data regarding the different existing groups, the network devices in each group, the different functionality of each device, and the relationships between each of the devices and each of the groups. Furthermore, each time a user clicks on a group or device to view more information about a group or device, the access device may transmit a request or query to storage so that the access device may retrieve the device/group/profile information to display/present to the user on display 1900. Furthermore, various communications may be transmitted and received between the access device and storage and any other device (e.g. cloud network) that may be controlling/performing any automatic grouping function. For example, if a different device (other than the access device) is performing the automatic grouping function, the access device may send a request to that device to perform automatic grouping based on the network devices that are existing on the network and any new network devices that have recently joined the network, along with any information collected about the functions/capabilities of the network devices. The device performing automatic grouping may then transmit back to the access device information about its suggested grouping so that the access device may present the grouping information to the user on its display. If the user makes any edits/changes to the suggested grouping, the access device may transmit back to the automatic grouping device a communication indicating the changes made by the user so as to allow the device to learn and adapt regarding the user's preferences and/or any judgment calls it made when preparing a suggested grouping profile for the access device/user.

As described herein, new (or existing) network devices may be presented to the user, for example via a display on an access device, for the device (automatically) or the user (manually) to decide which devices should be grouped together into existing or new groups. Since the access device may determine which devices are present and what the functions are of each of those devices, the access device may dynamically adjust the presentation of the list of devices available to be grouped based on both functions that each device is capable of and selections made by the user. For example, if a user selects a device to be placed in a certain group, a access device may remove certain other devices from the display or mark other devices as devices that are unable to be grouped with the device selected by the user. More specifically, for example, if an access device displays network devices that are or are connected to a light and a coffee maker, and if a user selects the device that is or is connected to a light, the access device may remove the coffee maker network device from the display if the access device determined that, based on the capable functions of the light and the coffee maker, the light and the coffee maker cannot or should not be grouped. Such a decision to not allow grouping of certain devices together may be based on the functions of those devices and/or the capabilities of the access device/system to control such devices at the same time. Instead of removing the coffee maker from the display completely, the access device may mark the device as being unable to be grouped with the selected device, such as by graying out the display of the coffee maker device or placing the display towards the bottom of the access device display in a list for devices that cannot be grouped with the selected device. In certain embodiments, the access device may provide functionality at the access device for the user to override the choice of the access device to prevent the light and the coffee maker from being grouped.

As noted with respect to FIG. 19, the user may also group the new network devices into either new groups (e.g. by pressing button 1942) or existing groups (by pressing grouping buttons 1944). The user may select whether to group the new network devices, either manually or automatically, at the same time (e.g. on the same display screen) as when it selects whether to allow the new network devices to join the network. FIG. 20 illustrates an exemplary user interface display 2000 for an application on an access device, according to embodiments of the present invention. Display 2000 is similar to display 1900, except instead of just presenting a display of a query to the user regarding whether the user would like to authenticate each new network device, display 2000 also includes a query for each new network device regarding whether the user would like to group the new network devices. For example, the user may select (e.g. check off) the "Group?" query 1958 with respect to new network device 1908 (and/or query 1960 with respect to new network device 1910 and/or query 1962 with respect to new network device 1912) and then select (e.g. press) a button within buttons display 1944 of the group that the user would like the selected new network device to join. Alternatively, the user may select multiple new network devices (by checking off the "Group?" query for multiple devices) and also select "yes" as an answer to the "Auto Group?" query 1940, causing the access device (or cloud or other device connected to the access device) to suggest a grouping profile for the selected new network devices. Since the user may both authenticate and group new network devices on one display, the user may more efficiently join and organize such new network devices.

The embodiments of the present invention described herein are described with respect to certain numbers of "existing" and "new" network devices (e.g. three existing and three new). However, the embodiments of the present invention could be performed with, for example, only two existing and two new network devices, or any other number of each type of device.

Figure 21:
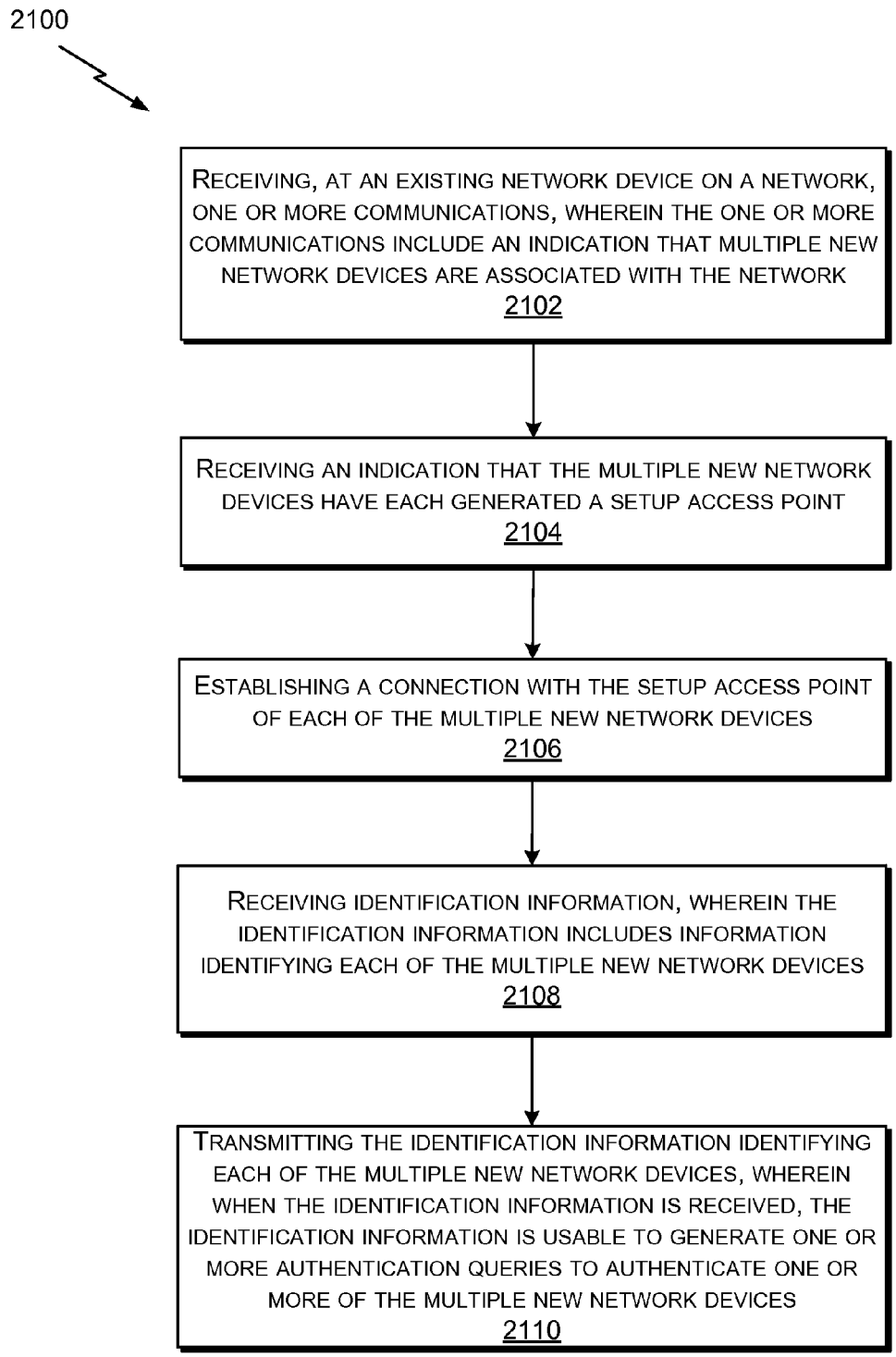
FIG. 21 is a flow chart showing an exemplary process for a network to automatically select grouping for network devices on a network, according to embodiments of the present invention, according to embodiments of the present invention.

FIG. 21 is a flow chart 2100 showing an exemplary process for a network to setup multiple network devices, according to embodiments of the present invention. Step 1202 includes receiving, at an existing network device on a network, one or more communications, wherein the one or more communications include an indication that multiple new network devices are associated with the network. For example, network devices may, as described herein, open a setup access point through which an existing network device may connect to the network device(s). Such a setup access point may communicate with its surrounding area and devices in that area that the device has been powered on and is ready to join a network. After one or more network devices have connected to an existing device on a network, the devices may transmit identification information related to the network device to an existing network device so that the existing device on the network and the network may know who the network device is. Furthermore, such information may allow the existing device and the network to authenticate the device trying to connect to it.

Step 1204 includes receiving an indication that the multiple new network devices have each generated a setup access point. Step 1206 includes establishing a connection with the setup access point of each of the multiple new network devices. Step 1208 includes receiving identification information, wherein the identification information includes information identifying each of the multiple new network devices. And step 1210 includes transmitting the identification information identifying each of the multiple new network devices, wherein when the identification information is received, the identification information facilitates generating one or more authentication queries to authenticate one or more of the multiple new network devices.

Figure 22:
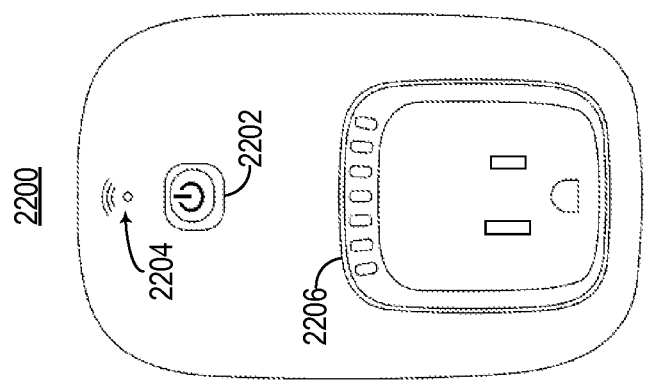
FIG. 22 illustrates an example of a front view of a network device, according to embodiments of the present invention.
Figure 23:
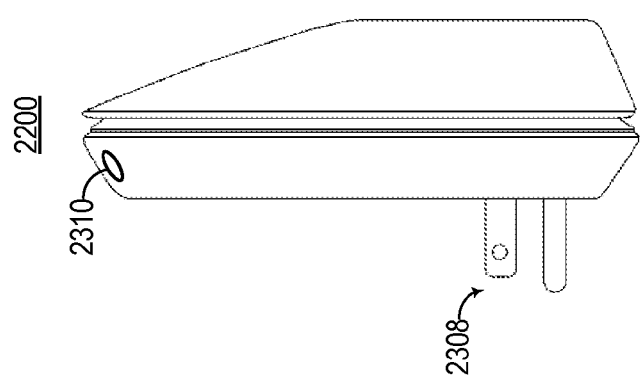
FIG. 23 illustrates an example of a side view of a network device, according to embodiments of the present invention.

FIG. 22 illustrates an example of a front view of a network device 2200. FIG. 23 illustrates an example of a side view of the network device 2200. The network device 2200 may include any of the network devices 102, 104, or 106 described herein. In some embodiments, the network device 2200 may be a home automation network device. For example, the network device 2200 may include a home automation switch that may be coupled with a home appliance. A user may wirelessly access the network device 2200 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 2200 may include a WiFi enabled switch that connects home appliances and other electronic devices to a compatible 802.11b/g/n/ac WiFi network. The network device 2200 may thus allow users to locally or remotely turn devices on or off from anywhere, program customized notifications, and/or change device status. The network device 2200 may further allow a user to create custom schedules or have devices respond to sunrise or sunset.

The network device 2200 includes an power switch 2202 that may be depressed in order to turn the network device 2200 on and off. In some embodiments, a light source may be integrated with or located behind the power switch. For example, a light-emitting diode (LED) may be located on a circuit board under the power button 2202. The light source may be illuminated when the network device 2200 is powered on, and may not be illuminated when the network device 2200 is powered off.

The network device 2200 further includes a communications signal indicator 2204. The signal indicator 2204 may indicate whether the network device 2200 has access to a communications signal, such as a WiFi signaL For example, the signal indicator 2204 may include a light source (e.g., a LED) that illuminates when the network device 2200 is connected to a communications signal. The light source may depict different colors or other characteristics (e.g., flashing, dimming, or the like) to indicate different levels of signal strength or mode of operation.

The network device 2200 includes a restore button 2310. The restore button 2310 may allow a user to reset the network device 2200 to factory default settings. For example, upon being depressed, the restore button 2310 may cause all software on the device to be reset to the settings that the network device 2200 included when purchased from the manufacturer.

The network device 2200 further includes a plug 2308 and an outlet 2206. The plug 2308 allows the network device 2200 to be plugged into a wall socket, such as a socket providing 120V, 220V, or the like. In turn, an appliance may be plugged into the outlet 2206. Once the network device 2200 is registered according to the techniques described above, an appliance plugged into the socket 2206 may be controlled by a user using an access device (e.g., access device 108).

Figure 24:
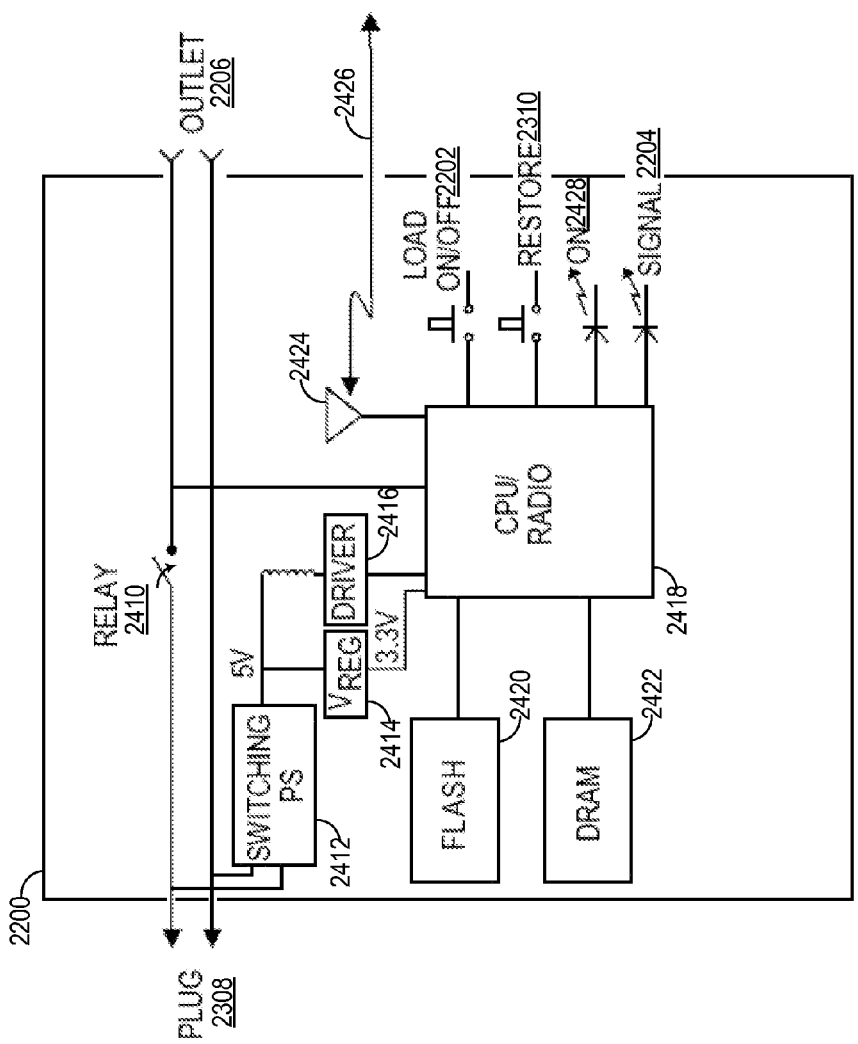
FIG. 24 illustrates an example of a block diagram of a network device, according to embodiments of the present invention.

FIG. 24 is an example of a block diagram of the network device 2200 depicting different hardware and/or software components of the network device 2200. As described above with respect to FIGS. 22 and 23, the network device 2200 includes the outlet 2206, the plug 2308, the power button 2202, the restore button 2310, and the communications signal indicator 2204. The network device 2200 also includes light source 2428 associated with the power button 2202. As previously described, the light source 2428 may be illuminated when the network device 2200 is powered on.

The network device 2200 further includes a relay 2410. The relay 2410 is a switch that controls whether power is relayed from the plug 2308 to the outlet 2206. The relay 2410 may be controlled either manually using the power button 2202 or remotely using wireless communication signals. For example, when the power button 2202 is in an ON position, the relay 2410 may be closed so that power is relayed from the plug 2308 to the outlet 2206. When the power button 2202 is in an OFF position, the relay 2410 may be opened so that current is unable to flow from the plug 2308 to the outlet 2206. As another example, an application or program running on an access device may transmit a signal that causes the relay 2410 to be opened or closed. For instance, an access application may display a graphical interface on the access device that includes a power button. The user may tap or otherwise select the power button, and the access application may send a communication signal (e.g., over a WiFi network) to the network device 2200 instructing the network device 2200 to open or close the relay 2410.

The network device 2200 further includes flash memory 2420 and dynamic random access memory (DRAM) 2422. The flash memory 2420 may be used to store instructions or code relating to an operating system, one or more applications, and any firmware. The flash memory 2420 may include nonvolatile memory so that any firmware or other program can be can updated. In the event the network device 2200 loses power, information stored in the flash memory 2420 may be retained. The DRAM 2422 may store various other types of information needed to run the network device 2200, such as all runtime instructions or code.

The network device 2200 further includes a CPU/Radio 2418. The CPU/Radio 2418 controls the operations of the network device 2200. For example, the CPU/Radio 2418 may execute various applications or programs stored in the flash memory 2420 and/or the dynamic random access memory (DRAM) 2422. The CPU/Radio 2418 may also receive input from the various hardware and software components, interpret the input, and perform one or more functions in response to the input. As one example, the CPU/Radio 2418 may determine whether the power button 2202 has been pressed, and determines whether the relay 2410 needs to be opened or closed. The CPU/Radio 2418 may further perform all communications functions in order to allow the network device 2200 to communicate with other network devices, one or more gateways, a cloud network, and/or one or more access devices. While the CPU and radio of the network device 2200 are shown to be combined in the CPU/Radio 2418, one of ordinary skill in the art will appreciate that, in some embodiments, the CPU and radio may be separately located within the network device 2200. For example, CPU circuitry may be situated at a separate location on a circuit board from the location of radio circuitry, the CPU circuitry may be located on a different circuit board from the radio circuitry, or the like.

The network device 2200 may communicate with other devices and/or networks via antenna 2424. For example, antenna 2424 may include a 2.4 GHz antenna, a 5 GHz antenna, or the like, that can transmit and receive WiFi communications signals. The antenna 2424 may include other types of antennas that can communicate Bluetooth® signals, Zigbee® signals, Ultra-Wideband (UWB) signals, and/or the like. In some embodiments, the network device 2200 may include multiple antennas for communicating different types of communication signals. As one example, the network device 2200 may include both a 2.4 GHz antenna and a 5 GHz antenna.

The network device 2200 further includes a driver 2416, a switching power supply 2412, and a voltage regulator 2414. The driver 2416 may include instructions or code that can be used to translate control signals or commands received from applications running on the DRAM 2422 to commands that the various hardware components in the network device 2200 can understand. In some embodiments, the driver 2416 may include an ambient application running on the DRAM 2422. The switching power supply 2412 may be used to transfer power from the outlet in which the plug 2308 is connected to the various loads of the network device 2200 (e.g., CPU/Radio 2418). The switching power supply 2412 may efficiently convert the voltage and current characteristics of the electrical power to a level that is appropriate for the components of the network device 2200. For example, the switching power supply 2412 may perform AC-DC conversion. In some embodiments, the switching power supply 2412 may be used to control the power that is relayed from the plug 2308 to the outlet 2206. The voltage regulator 2414 may be used to convert the voltage output from the switching power supply 2412 to a lower voltage usable by the CPU/Radio 2418. For example, the voltage regulator 2414 may regulate the DC voltage from 5V to 3.3V.

In various embodiments, functions may be stored as one or more computer-program products, such as instructions or code, in a non-transitory machine-readable storage medium, such as the flash memory 2420 and/or the DRAM 2422. The network device 2200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 2420 and/or the DRAM 2422, may be a processor-readable memory and/or a computer-readable memory that stores software code (programming code, instructions, etc.) configured to cause a processor(s) within the CPU/Radio 2418 to perform the functions described. In other embodiments, one or more of the functions described may be performed in hardware.

A set of these instructions and/or code might be stored on a non-transitory machine-readable storage medium, such as the flash memory 2420 and/or the DRAM 2422. In some cases, the storage medium might be incorporated within a computer system, such as the CPU/Radio 2418. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 2200 and/or might take the form of source and/or installable code, which, upon compilation and/or installation on the network device 2200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 2200 may have other components than those depicted in FIGS. 22-24. Further, the embodiment shown in the figures are only one example of a network device that may incorporate an embodiment of the invention. In some other embodiments, network device 2200 may have more or fewer components than shown in the figure, may combine two or more components, or may have a different configuration or arrangement of components.

Figure 25:
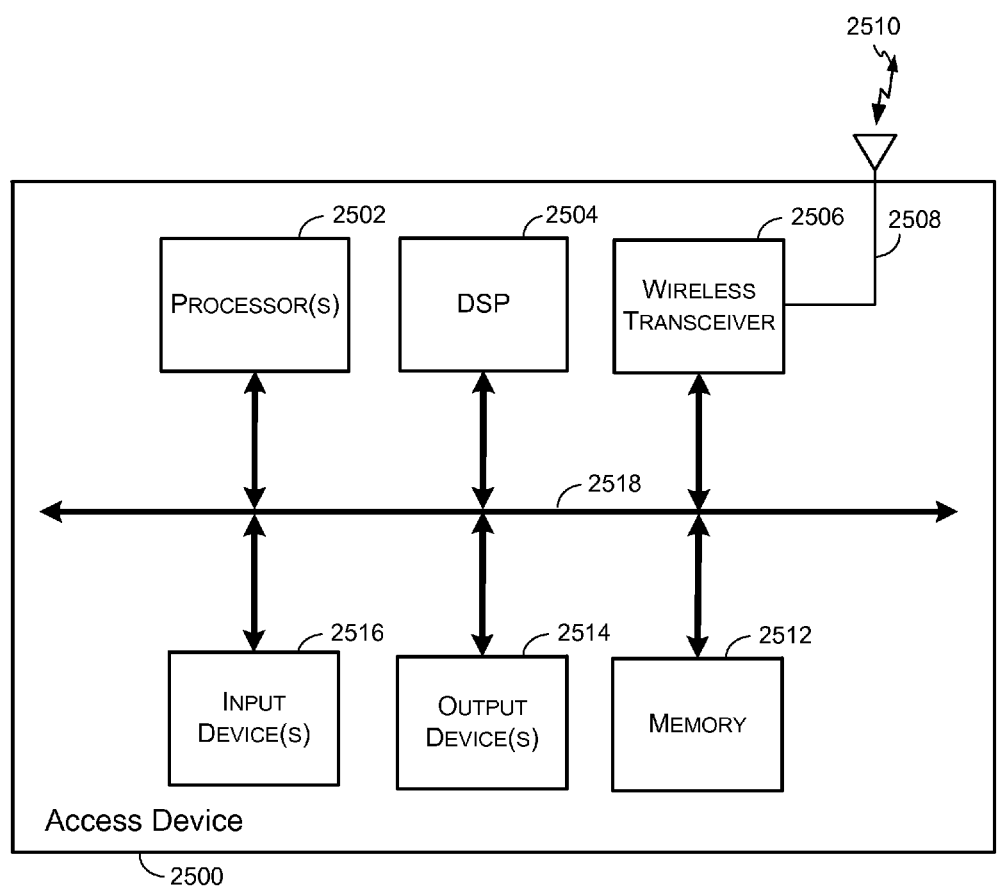
FIG. 25 illustrates a block diagram illustrating an example of an access device, according to embodiments of the present invention.

FIG. 25 illustrates an example of an access device 2500. The access device 2500 may include any human-to-machine interface with network connection capability that allows access to a network. For example, the access device 2500 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2500 includes hardware elements that can be electrically coupled via a bus 2518 (or may otherwise be in communication, as appropriate). In one embodiment, the bus 2518 can be used for the processor(s) 2502 to communicate between cores and/or with the memory 2512. The hardware elements may include one or more processors 2502, including without limitation one or more general-purpose processors and/or one or more special-purpose processors (such as digital signal processing chips, graphics acceleration processors, and/or the like); one or more input devices 2516, which can include without limitation a camera, a mouse, a keyboard, a touch sensitive screen, a touch pad, a keypad, and/or the like; and one or more output devices 2514, which can include, without limitation, a display, a printer, and/or the like.

The access device 2500 may include one or more wireless transceivers 2506 connected to the bus 2518. The wireless transceiver 2506 may be operable to receive wireless signals (e.g., signal 2510) via antenna 2508. The wireless signal 2510 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, CDMA2000 network). Wireless transceiver 2506 may be configured to receive various radio frequency (RF) signals (e.g., signal 2510) via antenna 2508 from one or more gateways, network devices, other access devices, cloud networks, and/or the like. Access device 2500 may also be configured to decode and/or decrypt, via the DSP 2504 and/or processor(s) 2502, various signals received from one or more gateways, network devices, other access devices, cloud networks, and/or the like.

The access device 2500 may further include (and/or be in communication with) one or more non-transitory machine-readable storage mediums or storage devices (e.g., memory 2512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2512, such as RAM, ROM, FLASH, or disc drive, and executed by processor(s) 2502 or DSP 2504. The access device 2500 can also comprise software elements (e.g., located within the memory 2512), including, for example, an operating system, device drivers, executable libraries, and/or other code, such as one or more application programs, which may comprise computer programs implementing various functions. Memory 2512 may be a non-transitory machine-readable storage medium, processor-readable memory, and/or a computer-readable memory that stores the one or more computer-program products configured to cause the processor(s) 2502 and/or DSP 2504 to perform the various functions. In other embodiments, the various functions described may be performed in hardware.

Figure 26:
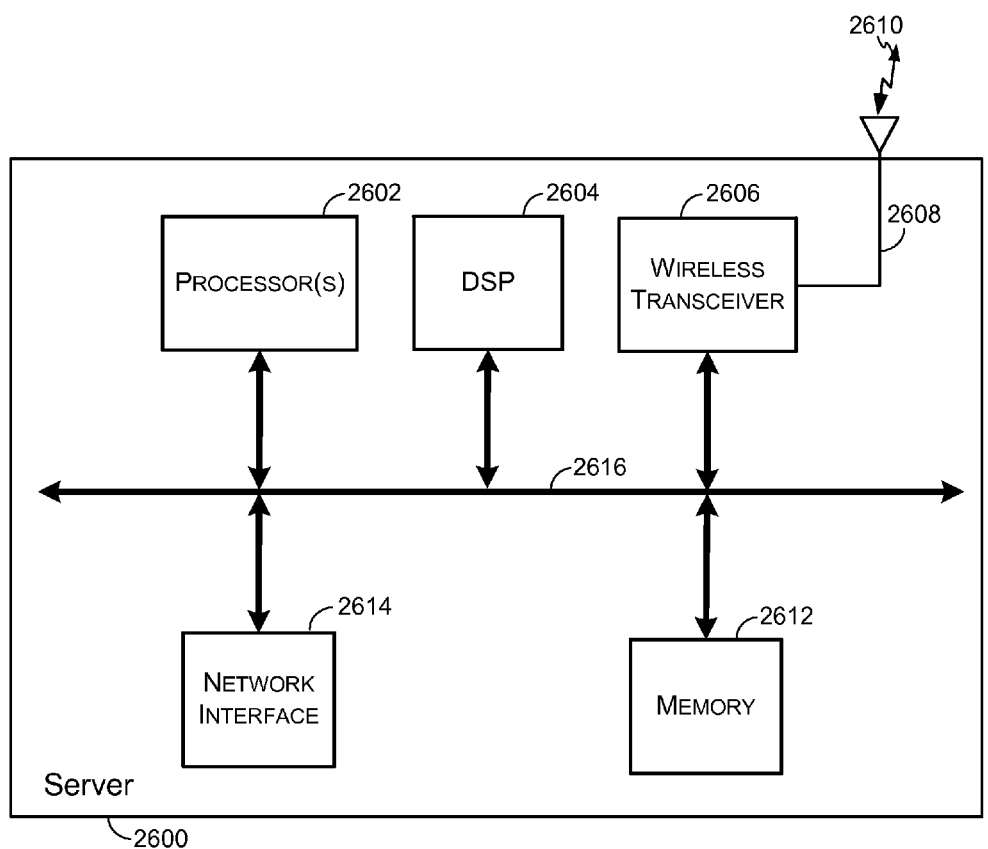
FIG. 26 illustrates a block diagram illustrating an example of a server, in accordance with some embodiments.

FIG. 26 illustrates an example of a server 2600. The server 2600 includes hardware elements that can be electrically coupled via a bus 2616 (or may otherwise be in communication, as appropriate). In one embodiment, the bus 2616 can be used for the processor(s) 2602 to communicate between cores and/or with the memory 2612. The hardware elements may include one or more processors 2602, including without limitation one or more general-purpose processors and/or one or more special-purpose processors (such as digital signal processing chips, graphics acceleration processors, and/or the like), memory 2612, DSP 2604, a wireless transceiver 2606, a bus 2616, and antenna 2608. Furthermore, in addition to the wireless transceiver 2606, server 2600 can further include a network interface 2614 to communicate with a network (e.g., a local area network, a network of a preferred carrier, Internet, etc.).

The server 2600 may further include (and/or be in communication with) one or more non-transitory machine-readable storage mediums or storage devices (e.g., memory 2612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2612. The server 2600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 2612 may be a non-transitory machine-readable storage medium, processor-readable memory, and/or a computer-readable memory that stores the one or more computer-program products configured to cause the processor(s) 2602 to perform the functions described. In other embodiments, one or more of the functions described may be performed in hardware.

A set of these instructions and/or code might be stored on a non-transitory machine-readable storage medium, such as the memory 2612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2600 and/or might take the form of source and/or installable code, which, upon compilation and/or installation on the server 2600 (e.g., using any of a variety of generally available compilers, installation programs, compression/decompression utilities, etc.) then takes the form of executable code.

Figure 27:
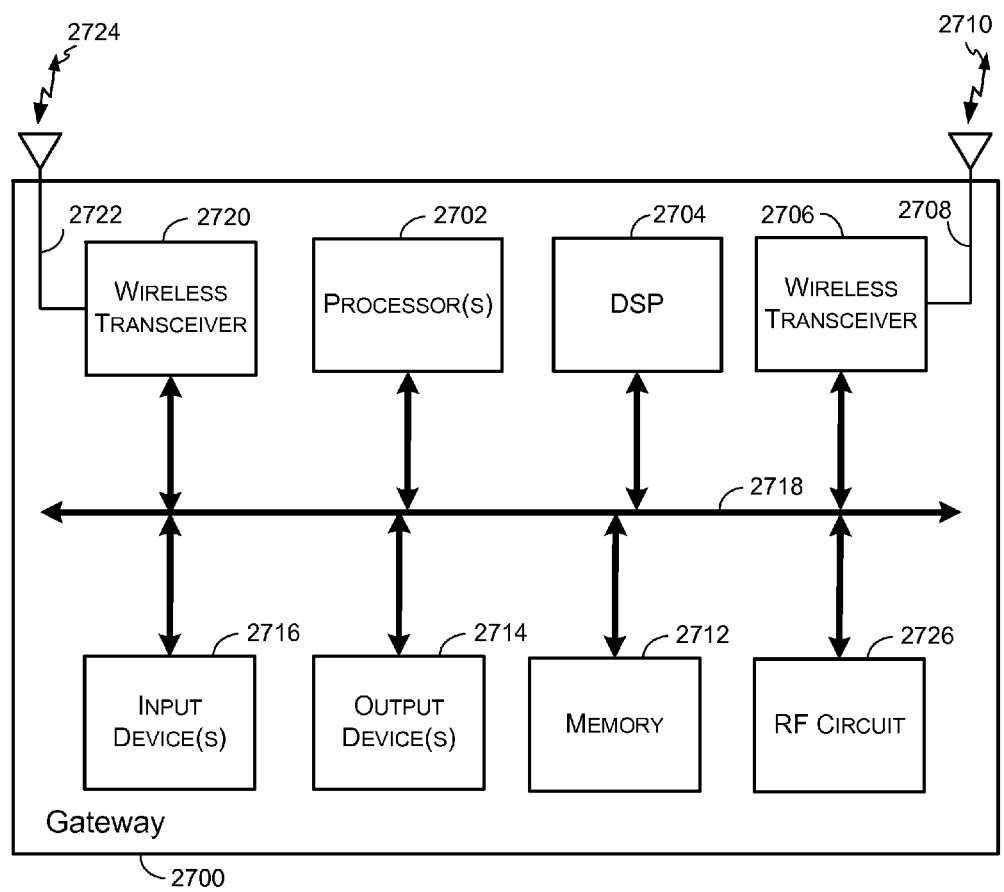
FIG. 27 illustrates a block diagram illustrating an example of a gateway, in accordance with some embodiments.

FIG. 27 illustrates an example of a gateway 2700. The gateway 2700 may include a range extending device, a router, an access point, a modem, and/or any other device that provides network access among one or more computing devices and/or external networks. For example, the gateway 2700 may include a router gateway with access point and router functionality, and may further include an Ethernet switch and/or a modem. As another example, the gateway 2700 may include a range extending gateway that may be used to improve signal range and strength within a network by taking an existing signal from another gateway (e.g., a router gateway, an access point, or the like) and rebroadcasting the signal to create a second logical network.

The gateway 2700 includes hardware elements that can be electrically coupled via a bus 2718 (or may otherwise be in communication, as appropriate). In one embodiment, the bus 2718 can be used for the processor(s) 2702 to communicate between cores and/or with the memory 2712. The hardware elements may include one or more processors 2702, including without limitation one or more general-purpose processors and/or one or more special-purpose processors (such as digital signal processing chips, graphics acceleration processors, and/or the like); one or more input devices 2716, which can include without limitation one or more buttons, a keyboard, a keypad, a touch sensitive screen, a touch pad, and/or the like; and one or more output devices 2714, which can include, without limitation, a display, light or sound indicators, and/or the like.

The gateway 2700 may include one or more wireless transceivers 2706 and 2720 connected to the bus 2718. The wireless transceiver 2706 may be operable to receive wireless signals (e.g., a wireless signal 2710) via an antenna 2708. The wireless transceivers 2720 may be operable to receive wireless signals (e.g., a wireless signal 2714) via an antenna 2722. The wireless transceivers 2706 and 2720 may each include a WiFi transceiver radio designed to transmit and receive signals using frequencies of a specific frequency band, which may be referred to herein as "WiFi circuits." For example, wireless transceiver 2706 may include a 2.4 GHz WiFi circuit, and wireless transceiver 2720 may include a 5 GHz WiFi circuit. Accordingly, the gateway 2700 may include a single WiFi circuit for a first WiFi frequency band, and a single WiFi circuit for a second WiFi frequency band. In some embodiments, the gateway 2700 may include multiple wireless transceivers (not shown) for each available frequency band. The antennas 2708 and 2722 may include multiple band antennas that can transmit and/or receive signals over different frequency bands.

The gateway 2700 may further include radio frequency (RF) circuit 2726. In some embodiments, the wireless transceivers 2706 and 2720 may be integrated with or coupled to the RF circuit 2726 so that the RF circuit 2726 includes the wireless transceivers 2706 and 2720. In some embodiments, the wireless transceivers 2706 and 2720 and the RF circuit 2726 are separate components. The RF circuit 2726 may include a RF amplifier that may amplify signals received over antennas 2708 and 2722. The RF circuit 2726 may also include a power controller that may be used to adjust signal amplification by the RF amplifier. The power controller may be implemented using hardware, firmware, software, or any combination thereof.

The wireless signals 2710 and 2724 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, CDMA2000 network). Wireless transceivers 2706 and 2720 may be configured to receive various radio frequency (RF) signals (e.g., signals 2710 and 2724) via antennas 2708 and 2724, respectively, from one or more other gateways, access devices, network devices, cloud networks, and/or the like. Gateway 2700 may also be configured to decode and/or decrypt, via the DSP 2704 and/or processor(s) 2702, various signals received from one or more gateways, network devices, cloud networks, and/or the like.

The gateway 2700 may include a power supply (not shown) that can power the various components of the gateway 2700. The power supply may include a switch-mode power supply, a linear power supply, a push-pull power supply, or any other suitable type of power supply. In some embodiments, the gateway 2700 may include multiple power supplies. For example, a switch-mode power supply may be used to condition input power, and a linear power supply may be used to power the RF circuit 2726. The power supply may be configured to operate over various ranges of appropriate input voltages.

The gateway 2700 may further include (and/or be in communication with) one or more non-transitory machine-readable storage mediums or storage devices (e.g., memory 2712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2712, such as RAM, ROM, FLASH, or disc drive, and executed by processor(s) 2702 or DSP 2704. The gateway 2700 can also comprise software elements (e.g., located within the memory 2712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 14. The memory 2712 may be a non-transitory machine-readable storage medium, processor-readable memory, and/or a computer-readable memory that stores the one or more computer-program products configured to cause the processor(s) 2702 to perform the functions described. In other embodiments, one or more of the functions described may be performed in hardware.

A set of these instructions and/or code might be stored on a non-transitory machine-readable storage medium, such as the memory 2712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2700 and/or might take the form of source and/or installable code, which, upon compilation and/or installation on the gateway 2700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer implemented method, comprising:
   receiving, at an existing network device on a network, an indication that a set of new network devices have generated setup access points, wherein the set of new network devices includes multiple network devices;
   establishing a connection with the setup access points of the set of new network devices;
   receiving new network device identification information associated with the network devices in the set of network devices, wherein new network device identification information includes information identifying the network devices in the set of new network devices;
   transmitting, by the existing network device, a communication to each network device in the set of new network devices;

receiving a response from each network device in the set of new network devices that received a communication;
analyzing one or more characteristics of the received responses to determine a characteristic associated with the responses;
establishing a network device group, wherein the network device group includes network devices associated with the determined characteristic of the responses; and
transmitting the new network device identification information associated with the network devices in the network device group, wherein when the new network device identification information is received, the new network device identification information facilitates generating one or more authorization queries to the new network devices in the network device group to join the network, and wherein the network devices in the network device group join the network using the one or more authorization queries.

2. The method of claim 1, further comprising:
transmitting one or more authorization queries, wherein receiving authorization queries facilitates displaying identification information.

3. The method of claim 1, wherein the determined characteristic includes an amount of time between when the communication is transmitted from the existing network device to a particular new network device in the set of new network devices and when the response is received by the existing network device from the particular new network device.

4. The method of claim 1, further comprising:
receiving one or more responses to the one or more authorization queries; and
transmitting network credentials corresponding to each of the responses to the one or more authorization queries, wherein network credentials facilitate new network devices in the network device group joining the network.

5. The method of claim 1, further comprising:
transmitting one or more association queries, wherein the one or more association queries include a request to determine whether the new network devices in the set of new network devices are associated with the network.

6. The method of claim 1, further comprising:
analyzing the identification information associated with two or more new network devices of the set of new network devices, wherein analyzing includes determining one or more capabilities common to the two or more new network devices; and
generating a grouping of network devices, wherein the grouping includes new network devices that share a common capability.

7. The method of claim 1, further comprising:
receiving an indication that an additional new network device of the set of new network devices has generated a setup access point;
establishing a connection with the setup access point of the additional new network device;
receiving additional new network device identification information, wherein the additional new network device identification information includes information identifying the additional new network device; and
transmitting the additional new network device identification information at the same time as the new network device identification information associated with the network devices in the network device group.

8. The method of claim 1,
wherein the received new network device identification information associated with the network devices in the network device group is aggregated before it is transmitted.

9. The method of claim 1, wherein the determined characteristic includes a locations of the network devices in the network device group, wherein a location of a network device is determined using a communication path that the response took between the network device in the network device group and the existing network device.

10. A computing device, comprising:
one or more processors; and
a memory having instructions stored thereon, which when executed by the one or more processors, cause the computing device to perform operations including:
receiving, at an existing network device on a network, an indication that a set of new network devices have generated setup access points, wherein the set of new network devices includes multiple network devices;
establishing a connection with the setup access points of the set of new network devices;
receiving new network device identification information associated with the network devices in the set of network devices, wherein new network device identification information includes information identifying the network devices in the set of new network devices;
transmitting, by the existing network device, a communication to each network device in the set of new network devices;
receiving a response from each network device in the set of new network devices that received a communication;
analyzing one or more characteristics of the received responses to determine a characteristic associated with the responses;
establishing a network device group, wherein the network device group includes network devices associated with the determined characteristic of the responses; and
transmitting the new network device identification information associated with the network devices in the network device group, wherein when the new network device identification information is received, the new network device identification information facilitates generating one or more authorization queries to the new network devices in the network device group to join the network, and wherein the network devices in the network device group join the network using the one or more authorization queries.

11. The computing device of claim 10, further comprising instructions, which when executed by the one or more processors, cause the computing device to perform operations including:
transmitting one or more authorization queries, wherein receiving authorization queries facilitates displaying identification information.

12. The computing device of claim 10, wherein the determined characteristic includes an amount of time between when the communication is transmitted from the existing network device to a particular new network device in the set of new network devices and when the response is received by the existing network device from the particular new network device.

13. The computing device of claim 10, further comprising instructions, which when executed by the one or more processors, cause the computing device to perform operations including:

receiving one or more responses to the one or more authorization queries; and transmitting network credentials corresponding to each of the responses to the one or more authorization queries, wherein network credentials facilitate new network devices in the network device group joining the network.

14. The computing device of claim 10, further comprising instructions, which when executed by the one or more processors, cause the computing device to perform operations including:

transmitting one or more association queries, wherein the one or more association queries include a request to determine whether the new network devices in the set of new network devices are associated with the network.

15. The computing device of claim 10, further comprising instructions, which when executed by the one or more processors, cause the computing device to perform operations including:

analyzing the identification information associated with two or more new network devices of the set of new network devices, wherein analyzing includes determining one or more capabilities common to the two or more new network devices; and generating a grouping of network devices, wherein the grouping includes new network devices that share a common capability.

16. The computing device of claim 10, further comprising instructions, which when executed by the one or more processors, cause the computing device to perform operations including:

receiving an indication that an additional new network device of the set of new network devices has generated a setup access point;

establishing a connection with the setup access point of the additional new network device;

receiving additional new network device identification information, wherein the additional new network device identification information includes information identifying the additional new network device; and transmitting the additional new network device identification information at the same time as the new network device identification information associated with the network devices in the network device group.

17. The computing device of claim 10, wherein the received new network device identification information associated with the network devices in the network device group is aggregated before it is transmitted.

18. A non-transitory computer-readable storage medium having instructions stored thereon, which when executed by a computing device, cause the computing device to:

receive, at an existing network device on a network, an indication that a set of new network devices have generated setup access points, wherein the set of new network devices includes multiple network devices;

establish a connection with the setup access points of the set of new network devices;

receive new network device identification information associated with the network devices in the set of network devices, wherein new network device identification information includes information identifying the network devices in the set of new network devices;

transmit, by the existing network device, a communication to each network device in the set of new network devices;

receive a response from each network device in the set of new network devices that received a communication;

analyze one or more characteristics of the received responses to determine a characteristic associated with the responses;

establish a network device group, wherein the network device group includes network devices associated with the determined characteristic of the responses; and transmit the new network device identification information associated with the network devices in the network device group, wherein when the new network device identification information is received, the new network device identification information facilitates generating one or more authorization queries to the new network devices in the network device group to join the network, and wherein the network devices in the network device group join the network using the one or more authorization queries.

19. The non-transitory computer-readable storage medium of claim 18, further comprising instructions configured to cause the computing device to:

transmit one or more authorization queries, wherein receiving authorization queries facilitates displaying identification information.

20. The non-transitory computer-readable storage medium of claim 18, wherein the determined characteristic includes an amount of time between when the communication is transmitted from the existing network device to a particular new network device in the set of new network devices and when the response is received by the existing network device from the particular new network device.

21. The non-transitory computer-readable storage medium of claim 18, further comprising instructions configured to cause the computing device to:

receive one or more responses to the one or more authorization queries; and transmit network credentials corresponding to each of the responses to the one or more authorization queries, wherein network credentials facilitate new network devices in the network device group joining the network.

22. The non-transitory computer-readable storage medium of claim 18, further comprising instructions configured to cause the computing device to:

transmit one or more association queries, wherein the one or more association queries include a request to determine whether the new network devices in the set of new network devices are associated with the network.

23. The non-transitory computer-readable storage medium of claim 18, further comprising instructions configured to cause the computing device to:

analyze the identification information associated with two or more new network devices of the set of new network devices, wherein analyzing includes determining one or more capabilities common to the two or more new network devices; and generate a grouping of network devices, wherein the grouping includes new network devices that share a common capability.

24. The non-transitory computer-readable storage medium of claim 18, further comprising instructions configured to cause the computing device to:

receive an indication that an additional new network device of the set of new network devices has generated a setup access point;

establish a connection with the setup access point of the additional new network device;

receive additional new network device identification information, wherein the additional new network device identification information includes information identifying the additional new network device; and transmit the additional new network device identification information at the same time as the new network device identification information associated with the network devices in the network device group.

25. The non-transitory computer-readable storage medium of claim 18, wherein received new network device identification information associated with the network devices in the network device group is aggregated before it is transmitted.

\* \* \* \* \*